US010663609B2

(12) United States Patent
Al-Dossary et al.

(10) Patent No.: US 10,663,609 B2
(45) Date of Patent: May 26, 2020

(54) COMBINING MULTIPLE GEOPHYSICAL ATTRIBUTES USING EXTENDED QUANTIZATION

(71) Applicant: Saudi Arabian Oil Company, Dhahran (SA)

(72) Inventors: Saleh Al-Dossary, Dammam (SA); Jimsong Wang, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 832 days.

(21) Appl. No.: 14/042,014

(22) Filed: Sep. 30, 2013

(65) Prior Publication Data
US 2015/0094958 A1 Apr. 2, 2015

(51) Int. Cl.
G01V 1/34 (2006.01)
(52) U.S. Cl.
CPC ............. G01V 1/345 (2013.01); G01V 1/34 (2013.01)
(58) Field of Classification Search
CPC .................................. G01V 1/345; G01V 1/34
USPC .............................................................. 702/6
See application file for complete search history.

(56) References Cited

U.S. PATENT DOCUMENTS

| 4,998,288 | A | * | 3/1991 | Bui | G06J 1/005 |
| | | | | | 382/254 |
| 5,123,084 | A | * | 6/1992 | Prevost | G06T 17/005 |
| | | | | | 345/420 |
| 6,278,949 | B1 | * | 8/2001 | Alam | G01V 1/288 |
| | | | | | 702/16 |
| 6,373,483 | B1 | * | 4/2002 | Becker | G06T 11/206 |
| | | | | | 345/419 |
| 6,571,177 | B1 | * | 5/2003 | Hardy | G01V 1/34 |
| | | | | | 367/70 |

(Continued)

FOREIGN PATENT DOCUMENTS

WO 02061463 A1 8/2002

OTHER PUBLICATIONS

Author: Tom Smith, Geophysical Insights and Sven Treitel, Tridekon Title: Introduction to Self-Organizing Maps in Multi-Attribute Seismic Data Date : Jan. 2011 Publisher: Geophysical Society of Houston p. 9-12.*

(Continued)

Primary Examiner — Alexander Satanovsky
Assistant Examiner — Douglas Kay
(74) Attorney, Agent, or Firm — Bracewell LLP; Constance G. Rhebergen; Albert B. Kimball, Jr.

(57) ABSTRACT

Four or more seismic attributes are integrated or merged into imaging formats and displayed for geological interpretation via extended quantization. Multi-attribute integration and classification improves the ability to identify geologic facies, and reservoir properties such as thickness, fluid type, or fracture intensity and orientation. The extended quantization groups up to eight attributes as a single attribute for geophysical data classification. Data group reduction criteria are provided to reveal common geological targets in the data, while preserving small variations or thin layers often found in hydrocarbon reservoirs. By combining multiple attributes, image quality is enhanced while providing analysts the ability to observe channels that might not be visible in any single attribute.

12 Claims, 18 Drawing Sheets
(3 of 18 Drawing Sheet(s) Filed in Color)

(56) References Cited

U.S. PATENT DOCUMENTS

| | | | |
|---|---|---|---|
| 6,674,894 B1* | 1/2004 | Parker | G06T 11/008 345/419 |
| 6,798,412 B2 | 9/2004 | Cowperthwaite | |
| 7,272,265 B2 | 9/2007 | Kouri et al. | |
| 7,280,105 B2 | 10/2007 | Cowperthwaite | |
| 7,308,139 B2* | 12/2007 | Wentland | G01V 1/34 382/181 |
| 8,077,061 B2* | 12/2011 | Cameron | G06F 17/2217 341/50 |
| 8,255,195 B2 | 8/2012 | Yogeswaren | |
| 8,380,435 B2* | 2/2013 | Kumaran | G01V 1/301 166/250.1 |
| 8,447,524 B2* | 5/2013 | Chen | G01V 1/32 702/13 |
| 8,902,221 B2* | 12/2014 | Hantschel | G06Q 10/00 345/418 |
| 9,366,772 B2* | 6/2016 | Imhof | G01V 1/306 |
| 2004/0098200 A1* | 5/2004 | Wentland | G01V 1/34 702/2 |
| 2004/0109586 A1* | 6/2004 | Samson | G06K 9/00127 382/109 |
| 2004/0217956 A1* | 11/2004 | Besl | G06T 15/00 345/419 |
| 2005/0131660 A1 | 6/2005 | Yadegar et al. | |
| 2006/0235666 A1 | 10/2006 | Assa et al. | |
| 2008/0021914 A1* | 1/2008 | Davies | G06F 17/30315 |
| 2008/0175478 A1* | 7/2008 | Wentland | G01V 1/34 382/181 |
| 2008/0297513 A1* | 12/2008 | Greenhill | G06Q 99/00 345/440 |
| 2010/0017354 A1 | 1/2010 | Chan et al. | |
| 2010/0149917 A1* | 6/2010 | Imhof | G01V 1/345 367/53 |
| 2010/0161232 A1* | 6/2010 | Chen | G01V 1/345 702/16 |
| 2011/0054857 A1* | 3/2011 | Moguchaya | G01V 99/00 703/2 |
| 2011/0272161 A1* | 11/2011 | Kumaran | G01V 1/301 166/369 |
| 2012/0209526 A1* | 8/2012 | Imhof | G01V 1/306 702/5 |
| 2013/0030782 A1 | 1/2013 | Yogeswaren | |
| 2013/0064040 A1* | 3/2013 | Imhof | G01V 1/30 367/73 |
| 2013/0096889 A1 | 4/2013 | Khvoenkova et al. | |
| 2013/0262061 A1* | 10/2013 | Laake | G01V 1/345 703/6 |

OTHER PUBLICATIONS

Tom Smith, Introduction to Self-Organizing Maps in Multi-Attribute Seismic Data:, Jan. 2011, Geophysical Society of Houston.*

Ashok Dutta, Seismic From Insights to Foresights:, Oct. 2011, New Technology Magazine.*

M. Gervautz and W. Purgathofer, "A simple method for color quantization: Octree Quantization", Graphics Gems, 1990, pp. 287-293, ISBN 978-0-12-286166-6.*

Ferrari (S. Ferrari and et al "Reducing and Filtering Point Clouds With Enhanced Vector Quantization", IEEE Transactions on Neural Networks, vol. 18, No. 1, Jan. 2007) (Year: 2007).*

Wu (X. Wu, "Color Quantization Programming and by Dynamic Principal Analysis", ACM Transactions on Graphics, vol. 11, No. 4, Oct. 1992, pp. 348-372.) (Year: 1992).*

Smith (T. Smith and et al, "Introduction to Self-Organizing Maps in Multi-Attribute Seismic Data", Geophysical Society of Houston, Jan. 2011) (Year: 2011).*

Carlson et al., "Multi-attribute visual classification of continuous and fragmented seismic data", SEG / San Antonio 2007 Annual Meeting, 2007, pp. 836-840.

International Search Report and Written Opinion for related PCT application PCT/US2014/051479 dated Mar. 4, 2015.

Guo et al., "Mapping multiple attributes to three and four component color models—A tutorial", Geophysics, 2008, pp. W7-W19, vol. 73, No. 3, Society of Exploration Geophysicists.

Yaohong D Jiang, "Set Operations Between Linear Octrees", Computers & Geosciences, 1996, pp. 509-516, vol. 22, No. 5, Elsevier Science Ltd, Great Britain.

Bloomberg et al., "Color quantization using modified median cut", 2008, pp. 1-6, http://www.leptonica.com/papers/mediancut.pdf.

Bloomberg et al., "Color quantization using octrees", 2008, pp. 1-10, www.leptonica.org/papers/colorquant.pdf.

Chopra et al., "Detecting stratigraphic features via cross-plotting of seismic discontinuity attributes and their volume visualization", SEG Houston 2009 International Exposition and Annual Meeting, 2009, pp. 1082-1086.

Chopra et al., "Seismic Attributes—a promising aid for geologic prediction", CSEG Recorder 2006 Special Edition, 2006, pp. 110-121.

Chopra et al., "Seismic attributes—A historical perspective", Geophysics, 2005, pp. 3-28, vol. 70, No. 5, Society of Exploration Geophysicists.

Chopra et al., "Seismic curvature attributes for mapping faults/fractures, and other stratigraphic features", CSEG Recorder 41, 2007, pp. 37-41.

Gervautz et al., "A Simple Method for Color Quantization: Octree Quantization", 1998 pp. 1-13.

Lin et al., "Mapping 3-D multi-attribute data into HLS color space—Application to Viton Dome LA.", SEG Expanded Abstracts 22, 2003, pp. 1-4.

Liu et al., "Multi-color display of spectral attributes", SEG New Orleans 2006 Annual Meeting, 2006, pp. 1098-1102.

Roberts, "Curvature Attributes and their Application to 3D Interpreted Horizons", First Break, 2001, pp. 1-14, vol. 19, Issue 2.

* cited by examiner

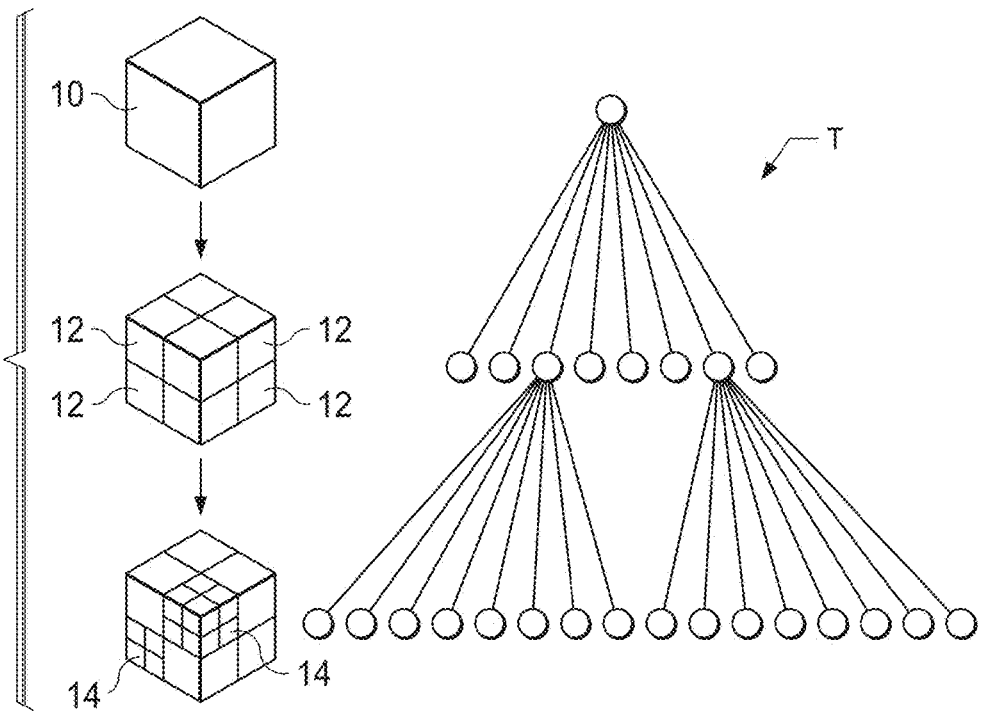

(a) AN INTEGER PRESENTATION OF A COLOR $[r_0 r_1 r_2 r_3 r_4 r_5 r_6 r_7 g_0 g_1 g_2 g_3 g_4 g_5 g_6 g_7 b_0 b_1 b_2 b_3 b_4 b_5 b_6 b_7]$ ← 20

(b) RE-ARRANGED INTO 3 ATTRIBUTE MATRIX $\begin{bmatrix} r_0 & r_1 & r_2 & r_3 & r_4 & r_5 & r_6 & r_7 \\ g_0 & g_1 & g_2 & g_3 & g_4 & g_5 & g_6 & g_7 \\ b_0 & b_1 & b_2 & b_3 & b_4 & b_5 & b_6 & b_7 \end{bmatrix}$ ← 22

(c) TRANSPOSE $\begin{bmatrix} r_0 & g_0 & b_0 \\ r_1 & g_1 & b_1 \\ r_2 & g_2 & b_2 \\ r_3 & g_3 & b_3 \\ r_4 & g_4 & b_4 \\ r_5 & g_5 & b_5 \\ r_6 & g_6 & b_6 \\ r_7 & g_7 & b_7 \end{bmatrix}$ ← 24

(d) SERIALIZED IN OCTREE DATA $[r_0 g_0 b_0 r_1 g_1 b_1 r_2 g_2 b_2 r_3 g_3 b_3 r_4 g_4 b_4 r_5 g_5 b_5 r_6 g_6 b_6 r_7 g_7 b_7]$ ← 26

COMBINING MULTIPLE GEOPHYSICAL ATTRIBUTES USING EXTENDED QUANTIZATION

BACKGROUND OF THE INVENTION

1. Field of the Invention

The present invention relates to processing of geophysical data for imaging subsurface features by merging or combining multiple seismic attributes in a composite image to identify geologic features of interest.

2. Description of the Related Art

Seismic attribute analyses are important to hydrocarbon exploration. Seismic attributes are a powerful aid to seismic interpretation, providing geoscientists with alternative images of faults and channels that can be used as components in unraveling the depositional environment structural deformation history. For example, a display of the coherence attribute is able to reveal ancient river beds and edges of wadis or beds; and frequency bright spots attributes indicated in a display are often tied with tops of gas reservoirs. Displays of volumetric curvature attributes can enable interpreters to delineate small flexures, folds, mounds, and differential compaction features on horizons that have not been explicitly picked and that are otherwise continuous and not seen by coherence.

With the advance of computer processing technology in speed, capacity and size, it has become relatively easy to generate large amounts of seismic attribute data for areas of interest or geological targets. Presently, the number of post-stack seismic attributes can well extend into hundreds. While attributes shed some insights into geological structures and reservoir properties, they also cause confusions and frustrations; some are overlapped or even repeated. The relationship among attributes, as well as the relationship between attributes and geological targets is sometimes complicated. However, it is desirable that as much actual information as possible be made available for analysis.

Various techniques have been developed to take use of two or three attributes together to assist interpretation. What is known as a cross-plot technique is one widely used to reveal the relationship between two attributes and to more easily visualize the clusters embedded in the dataset. Certain arrangements of color-maps combine three attributes, and the visualization by mapping the data according to what is known as RGB (red-green-blue) or as HLS (hue, lightness, space) schemes can help interpretation. However, these are intrinsically limited to three attributes due to the three mapping parameters. Other attempts have been made as composite plot techniques to overlap or superimpose multiple individual data attribute images. However, it has remained a challenge to integrate the data of more than three multiple attributes as a whole on a single image.

SUMMARY OF THE INVENTION

Briefly, the present invention provides a new and improved computer implemented method of forming with a computer system merged images of at least four geophysical attributes regarding an area of geological interest of subsurface formations. The computer implemented method receives input data values in digital bit format for data points of the geophysical attributes in the area of geological interest, and scales the received input data bit values for the geophysical attributes into data bytes of equal data bit length. The method converts the data bytes for the geophysical attributes into a merged serialized bit structure, and groups the data points of the geophysical attributes according to their scaled values. The method determines a reduction criterion for the grouped data points, and merges data points based on the determined reduction criterion. The method determining whether the groups of data points after merging match a specified number for output display. If not, the method returns to the steps of determining a reduction criterion and merging data points. If so, the method forms an output display of the merged geophysical attribute data.

The present invention also provides a new and improved data processing system for forming merged images of at least four geophysical attributes regarding an area of geological interest of subsurface formations. The data processing system includes a processor which receives input data values in digital bit format for data points of the geophysical attributes in the area of geological interest, and scales the received input data bit values for the geophysical attributes into data bytes of equal data bit length. The processor also converts the data bytes for the geophysical attributes into a merged serialized bit structure, and groups the data points of the geophysical attributes according to their scaled values. The processor determines a reduction criterion for the grouped data points, and merges data points based on the determined reduction criterion. The processor determines whether the groups of data points after merging match a specified number for output display. If not, the processor returns to the steps of determining a reduction criterion and merging data points; and if so, the processor providing the merged geophysical attribute data as output data. The data processing system also includes an output display forming an output image of the merged geophysical attribute data.

The present invention also provides a new and improved data storage device having stored in a non-transitory computer readable medium computer operable instructions for causing a data processing system to form merged images of at least four geophysical attributes regarding an area of geological interest of subsurface formations. The instructions stored in the computer readable medium causing the data processing system to receive input data values in digital bit format for data points of the geophysical attributes in the area of geological interest, and to scale the received input data bit values for the geophysical attributes into data bytes of equal data bit length. The instructions cause the data processing system to convert the data bytes for the geophysical attributes into a merged serialized bit structure, and group the data points of the geophysical attributes according to their scaled values. The instructions cause the data processing system to determine a reduction criterion for the grouped data points, and to merge data points based on the determined reduction criterion. The instructions cause the data processing system to determine whether the groups of data points after merging match a specified number for output display. If not, the instructions cause the data processing system to return to the steps of determining a reduction criterion and merging data points; and if so, to form an output display of the merged geophysical attribute data.

BRIEF DESCRIPTION OF THE DRAWINGS

The patent application file contains at least one drawing executed in color. Copies of this patent application publication with color drawings will be provided by the Office upon request and payment of necessary fee.

FIG. 1 is a schematic diagram of an Octree data structure for indexing three dimensional (3D) data.

FIG. 2 is a schematic diagram of rearrangement an integer color representation during Octree processing.

DETAILED DESCRIPTION OF THE PREFERRED EMBODIMENTS

Figure 3:
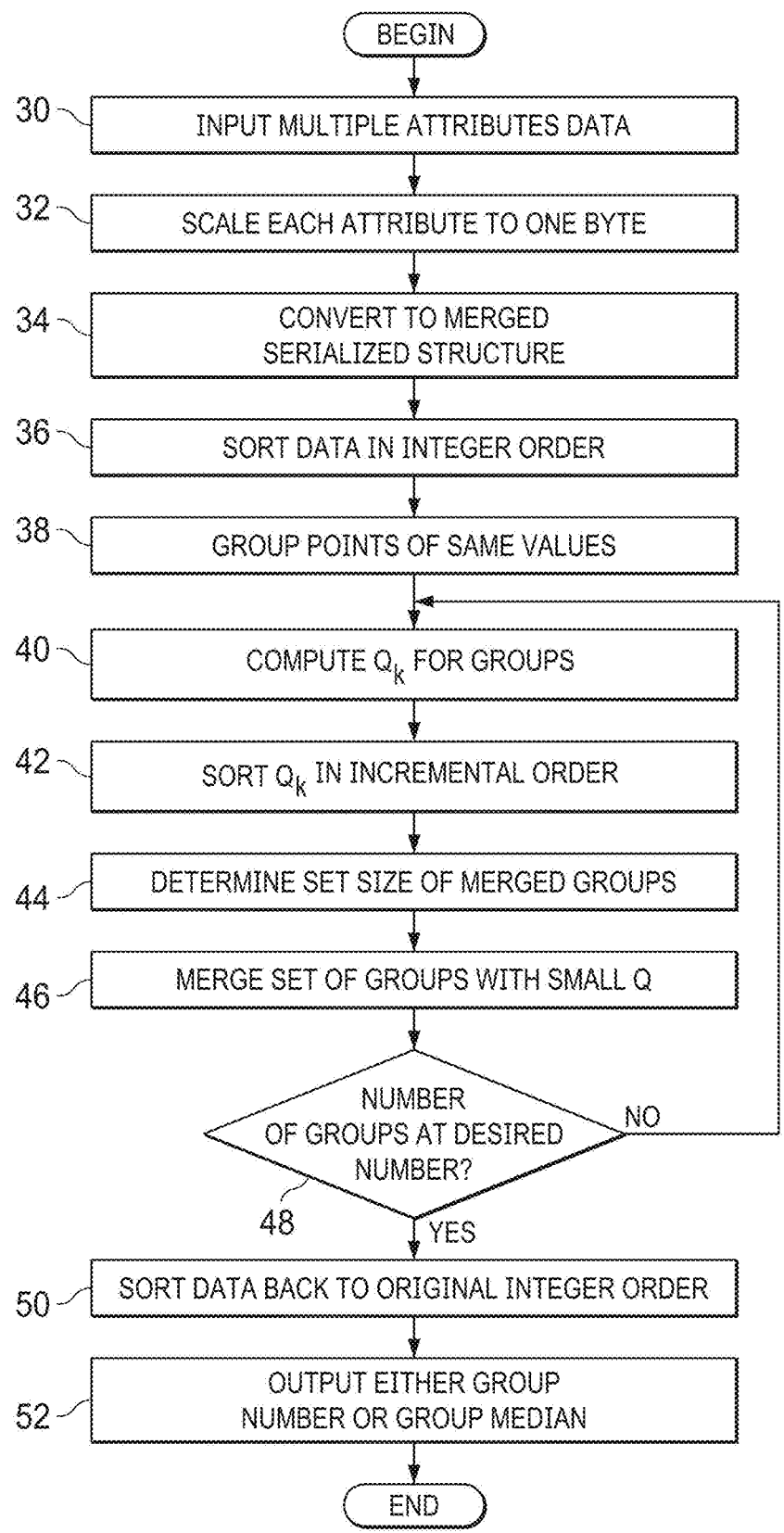
FIG. 3 is a functional block diagram or flow chart of steps illustrating the analytical methodology for combining multiple geophysical attributes using extended quantization according to the present invention.

With the present invention, it has been found that multiple geophysical data attributes can be assembled and processed in a methodology which is a form of extended quantization algorithm to handle four or more attributes and further classify data into reduced number of clusters. The methodology of the present inventions permits reduction of the size of groups of data regarding geophysical attributes, yet preserves major characters of each attribute.

The geological advantages resulting from the present invention are several. They include: the ability to obtain a composite image of multiple attributes and enhanced images and channels where applicable. The present invention also provides potential storage savings by avoiding saving individuals without sacrificing the data quality of the individual attributes.

Color quantization has been popular in image processing to reduce the number of colors in an original color image while maintaining visual similarity between the original image and the image resulting from quantization. A technique known as Octree quantization provided computational advantages among clustering methods of color quantization. It was efficient and memory economic in terms of memory and storage requirements.

By way of further background, an Octree is a tree data structure in which each internal node has up to eight children; each child node may have eight children nodes. The Octree data structure decomposes a whole data space recursively into several levels. It is analogous to a binary tree for 1D data where each parent node may have two children nodes. A simple example of application of Octree structure is 3D space indexing.

As illustrated in FIG. 1, a 3D cube 10 may be used to represent schematically any 3D data space; a data point in the cube 10 occupies a position in the cube. This cube can be partitioned as indicated in FIG. 1 into eight octants each of which is a sub-cube as indicated at 12. At this level, the position of the data point is represented by three bits corresponding to eight octants. As each sub-cube can be partitioned again, as shown as 14, 6 bits from two levels is more accurate for the position than one level. Recursively subdividing can generate more levels and thus more accurate position. Branches of a tree T in FIG. 1 indicate this partitioning in another schematic form.

Octree data structure is thus well adapted for indexing 3D data. One 3D cube can be partitioned at 8 sub-cubes; each sub-cube can be partitioned recursively. At certain accuracy level, a 3D point can be represented by an integer consists of 3 bits from each level. Since integers can be sorted in order, this structure serializes 3D data into 1D sequence. A color can be considered as a 3D point in RGB space. Normal 24 bits color has 8 levels when fit in the structure. This data structure facilitates the fastest color quantization algorithm.

As an example, a 24-bit color integer composed of red bits $r_0$ through $r_7$, green bits $g_0$ through $g_7$, and blue bits $b_0$ through $b_7$, respectively, is formed as an integer with Octree structure structured as illustrated in FIG. 2, where the integer presentation contains all the information, and actual structure in programming language is not necessary. A set of colors can be convened into a et of integer numbers. After the conversion, each color of a possible range of 256 ($2^8$) is represented by an integer. This set possesses important properties: (1) its integer thus can be sorted in order; (2) in the sorted order similar colors are arranged as neighbors; (3) medium color is simply the color at middle position of a group; (4) the distance or "dissimilarity" between two colors can be measured with what is known as a "bit-wise exclusive or" operation. It is noted that in the arrangement shown in FIG. 2, the three components are not equally weighted, the color red is more important than green since it is assigned the higher order bits in the 24-bit color integer. One bit difference in red in the color integer thus yields a larger distance in color than one bit in green because of the higher assigned order of red bits in the color integer. As an example of color distance, consider a situation when there are two series of colors represented by color integers with the red and green bits being the same, and the blue also the same except the lowest bit of blue is 0 in one series and 1 in the other. The distance between these two numbers is 1. However, for two series of colors with green and blue bits being the same, but with lowest bit of red in the integer being is 0 and in the other 1, the distance between two numbers, is the difference between $2^{16}$ and $2^{15}$, or 32768. Thus one bit difference in a red color series yields larger distance between two numbers in the series than that in green and blue. This asymmetric feature has its advantages and disadvantages for the purposes of the present invention, as will be further discussed below.

An integer color representation according to the Octree structure is thus composed of twenty four bits as indicated at 20 in FIG. 2; which can be rearranged into three 8 bit matrix as indicated at 22; transposed as indicated at 24 which after serialization yields another integer as indicated at 26; which is traditionally called as Octree data format.

With the present invention, it has been found that such data points in this format can be sorted in order. The distance between two data points can be easily measured with the "exclusive or" operation. Due to the octree binary data structure, a bit or digital operation of "exclusive or" of two data points is to a numerical minus operation. This data format is used in the quantization algorithm without actually programming data structure, as the equivalent operation can be done economically. The bit or digital "operation is a basic computer machine action, which is faster than a numerical minus operation, and distance determination between two data points thus is quicker.

Extension of Data Structure Quantization for Four or More Attributes

A color image has only three independent attributes, such as red, green and blue, to identify a particular color at a point in the image. Geophysical data are often associated with more than three attributes. The color Octree concept as illustrated in FIG. 2 is extended into higher dimensions for four or more attributes according to the present invention. For four attributes, there is a 32 bits tree. Instead of saying 32 bits tree it can be termed expanded quantization structure, with understanding that each node may have more than 8 branches. For example, 5 attributes of geophysical data can be written as 0xAABBCCDDEE. In this case, A is most significant while E is least significant.

Converted into extended data structure according to the present invention, in binary format the eight byte attribute data structure becomes a1b1c1d1e1f1g1h1a2b2c2d2e2f2g2h2 . . . a8b8c8d8e8f8g8h8. In this example an 8-attributes point is formed and a bit matrix transposes and serialization is performed in the same manner as described above for FIG. 2. Instead of R, G, B, as three colors, with the present invention there are eight possible attributes designated generally as A through H. Each point is the data structure is thus represented by the following 64 bits:
$[A_0B_0C_0D_0E_0F_0G_0H_0A_1B_1C_1D_1E_1F_1G_1H_1A_2B_2C_2D_2$
$E_2F_2G_2H_2A_3B_3C_3D_3E_3F_3G_3H_3A_4B_4C_4D_4E_4F_4G_4H_4A_5$
$B_5C_5D_5E_5F_5G_5H_5A_6B_6C_6D_6E_6F_6G_6H_6A_7B_7C_7D_7E_7$
$F_7G_7H_7]$ It can be seen that the present invention thus forms a new set of attribute data, combining data values of greater than three, from four to eight possible individual attributes. In addition all the organizational properties of an Octree structure are present and data value compression or reduction criteria can be applied to the attribute data. By keeping one byte resolution for each attribute, a long integer (64-bits) can accommodate 8-attributes.

The foregoing attribute example is of eight attributes, is developed based on 64-bits, the maximum that computer language and machine presently allows. It should be understood, however, that the methodology of the present invention can be extended larger numbers of data space beyond 8. For example, two 64-bits integers can be incorporated to represent a point in 16-dimensional space, and the group then reduced by first and secondary integer sorting and merging.

Attribute Data Reduction Criterion

The methodology of the present invention is illustrated in a flowchart F (FIG. 3). The flow chart F of FIG. 3 illustrates the structure of the logic of the present invention as embodied in computer program operating instructions. Those skilled in the art appreciate that the flow charts illustrate the structures of computer program code elements that function according to the present invention. The invention is practiced in its essential embodiment by computer components that use the program code instructions in a form that instructs a digital data processing system P (FIG. 4) to perform a sequence of processing steps corresponding to those shown in the flow chart F.

First, as indicated at step 30, the multiple types of attribute data to be merged for display are received as input data. According to the present invention, the multiple types of attribute data to be merged or combined with extended quantization are more than three, preferably from four to eight. As has been set forth above, it is also contemplated that higher numbers of attributes may be merged.

During step 32, the data for each of the multiple input attributes are scaled or subjected to data value compression to an eight bit (one byte) data range, with values extending over a value range of 256 increments from a minimum of 0 to a maximum of 255. In this format a data point of input attribute data is represented by an integer. The resultant dataset can be serialized into a 1-D ordered sequence. During step 34, the bits of the scaled attributes data bytes formed during step 32 are converted from their byte format to a merged serialized structure by the techniques described above and illustrated in FIG. 2.

During step 36 the attributes data in merged serialized structure is then sorted in integer order. The data points represented by the merged attribute data are then evaluated to determine their numerical value, and those with like or same values are grouped together as data during step 38.

During step 40, the grouped points resulting from step 38 are then subjected to a reduction processing to determine a reduction criterion quantity $Q_k$ to retain or preserve small geographical variations, in a manner described below. As a result of the sorting and grouping during step 38 prior to reduction, the reduction performed during step 40 is a global reduction instead of a local reduction.

During step 42, the values for $Q_k$ determined during step 40 are sorted in numerical order. The sorting value is based on Q, and k is the data group index. For different k, Q is different. The data processing system P then during step 44 determines the set size for the merged groups resulting from step 44, and during step 46 individual ones of the groups with small values of reduction criterion quantity Q are merged together. This, as a result of steps 46 and 48 the group reduction performed with the present invention takes into consideration both the number of samples and the data difference. This is in contrast to color quantization which is with a number of samples representation.

During step 48, the number of merged groups of data points is compared with a specified or established acceptable number. If the number of merged groups is greater than the specified number, processing returns to step 40 for determining $Q_k$ for the groups then present for processing. The foregoing processing methodology is iteratively performed until it is determined during step 48 that the number of groups is at the specified number.

At such time, processing proceeds to step 50 where the data is sorted back into integer order. The merged attribute data with the reduction criterion applied is then stored in memory of the data processing system P and then available for display in either group number or group median format as indicated at step 52. The displays in FIG. 5A through 5I, 6, 7A through 7G, 8A through 8I and 9A through 9F are in the group number format.

According to the present invention, when a dataset is converted and sorted in ordered integer sequence, it is ready for data value reduction. The points of the similar attributes values are consecutive in sorted sequence; values which are close enough to other attribute values points are thus merged together as one group. The group size is the number of its data points. For a color picture with Octree structure, a large group means large area which is thus more important for color imaging and which should be kept as intact as possible. Small groups for color imaging represent small areas in the picture and of less importance. Usually the small color groups are merged into one of their neighbors with closest color, and a medium number is used to represent the color value of the entire merged group. As small groups are merged, the number of groups, and thus the number of colors, is reduced.

Modification of Reduction Criterion in Order to Keep Small Geological Variations So far as is known, the traditional color reduction method has been based on the visual effect of color image, and accordingly limited to three variables, based on the three components of color as has been described. With the present invention, it has been found that such traditional methods have at least two drawbacks when applied to geophysical applications.

In a color imaging process, small groups that represent less area in picture are less visible and often absorbed. However, with geophysical attributes, some geologically meaningful but small variations such as thin-beds often exist that do not have large number of data points and belong to small groups in a dataset. Those small geological abnormalities may present important geological features or reservoir properties and should be kept rather than merged away. Another drawback is that traditional color reduction image processing can also fall in a trap of merging some locally close color group while leaving other close color groups unmerged.

The present invention avoids these two problems by first bringing data attribute value distance in as a reduction criterion together with group size, and then determining which group or groups to merge by computing global distance of each neighboring groups. Each time, only one global minimum group gets merged to its closest neighbors until a selected or desired number of groups are achieved.

In practice, for large datasets, at the beginning, a set of minimum groups is merged to its neighbors to reduce computing cost until the set number becomes less than 10, then the processing begins reduction of the groups one at a time. The number of groups in one set is determined by the current total groups and the output number of groups.

In determining whether a group is to be merged or to be kept, a quantity $Q_k$ is determined as follows:

$$Q_k = n_k * D_k^w$$

Where n is group size, D is color dissimilarity from its neighbors of all groups, k is number of group intervals, and w is color weight, usually w=1. If w were set at 0, the reduction algorithm would correspond to the traditional method. The larger the weight w, the more emphasis is put on data value dissimilarity than group size. The determined values of $Q_k$ for the group intervals are then sorted into increment order; the first set of small $Q_k$ groups will be merged, the minimum number for a set is 1.

Geophysical Data Implementation

Geophysical data (seismic attributes) are usually presented in floating point format. With the present invention, the input data for the four or geophysical attributes being processed are first translated and each attribute value scaled to one byte (0-255) as indicated at step 32. The scaled byte attributes for the four or more attributes being merged then are assembled during step 34 into 8-byte long integers from high order to lower order based on importance of the attribute for the purposes of analysis and interpretation.

Because of the asymmetric property of the data structure, important attributes should be arranged in significant bytes. For example, in some instances, as discussed below, curvature scales may be arranged with lower curvature number being more important than higher numbers, or higher frequency bands being assigned more importance than lower frequency bands. This selection may be made based on interpretation experience in situations where the importance of the attributes is known. It should be understood that other arrangements and assignments may also be made.

Interpretation experience on selecting attributes and ordering them play important roles on the success of extended quantization according to the present invention. If uncertainty about importance of attributes exists, two reverse sequences of processing with different attribute importance assignments in the serialized integer may be utilized, the first in a postulated order, and a second with attribute order in the serialized integer reversed. Averaging the reduction results can remove most side effects of attribute sequence and provide more unbiased merging data, so that the merged attribute data accurately represents major characters of each individual attribute.

Figure 4:
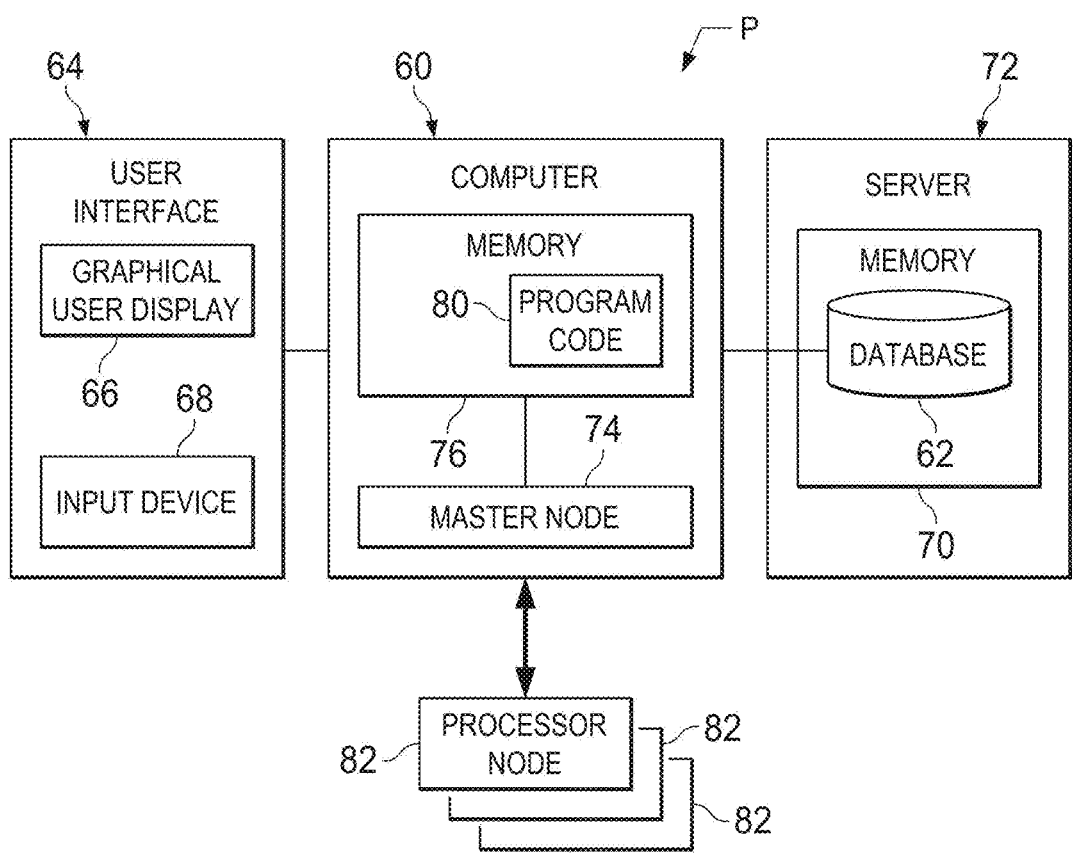
FIG. 4 is a schematic diagram of a data processing system for combining multiple geophysical attributes using extended quantization according to the present invention.

Considering now the data processing system according to the present invention, as illustrated in FIG. 4, the data processing system P is provided for combining multiple geophysical attributes using extended quantization according to the present invention. The data processing system P includes one or more central processing units or CPU's 60. The CPU or CPU's 60 which serve as cluster nodes have associated therewith a reservoir memory or database 62 for input attribute parameters, geophysical data, its organization and information content, and data processing results. A user interface 64 operably connected with the CPU 60 includes a graphical display 66 for displaying graphical images, a printer or other suitable image forming mechanism and a user input device 60 to provide a user access to manipulate, access and provide output forms of processing results, database records and other information.

The memory or database 62 is typically in a memory 70 of an external data storage computer 72. The database 62 contains data including the input attribute parameters, geophysical data, its organization and information content, and data processing results, according to the processing methodology of FIG. 3.

The CPU or computer 60 of data processing system P includes a master node 74 and an internal memory 76 coupled to the master node 74 to store operating instructions and control information, and to serve as storage or transfer buffers as required. The data processing system P includes program code 80 stored in memory 76. The program code 80, according to the present invention, is in the form of computer operable instructions causing the master node 74 to transfer data and instructions back and forth for processing by processor during processing.

It should be noted that program code 80 may be in the form of microcode, programs, routines, or symbolic computer operable languages that provide a specific set of ordered operations that control the functioning of the data processing system P and direct its operation. The instructions of program code 80 may be stored in non-transitory form either in memory 76 or on computer diskette, magnetic tape, conventional hard disk drive, electronic read-only memory, optical storage device, or other appropriate data storage device having a non-transitory computer usable medium stored thereon. Program code 80 may also be contained on a data storage device as a non-transitory computer readable medium.

Processor nodes 82 are general purpose, programmable data processing units programmed to perform the processing of geophysical attribute data described. The processor nodes 82 operate under control of the master node(s) 74. It should be understood that the data processing system P may be a computer of any suitable type with suitable processing and data storage capacity, such as a mainframe, a personal computer, or any suitable processing apparatus. It should also be understood that a number of commercially available data processing systems and types of computers may be used for purposes of the present invention.

Example—Surface Seismic Data

Figure 5A:
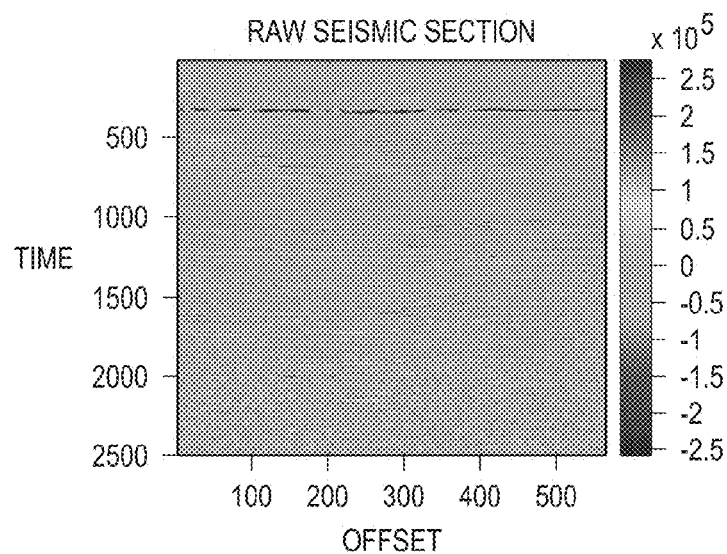
FIGS. 5A, 5B, 5C, 5D 5E, 5F, 5G, 5H and 5I are displays of frequency-banded surface seismic data during processing according to the present invention.
Figure 5B:
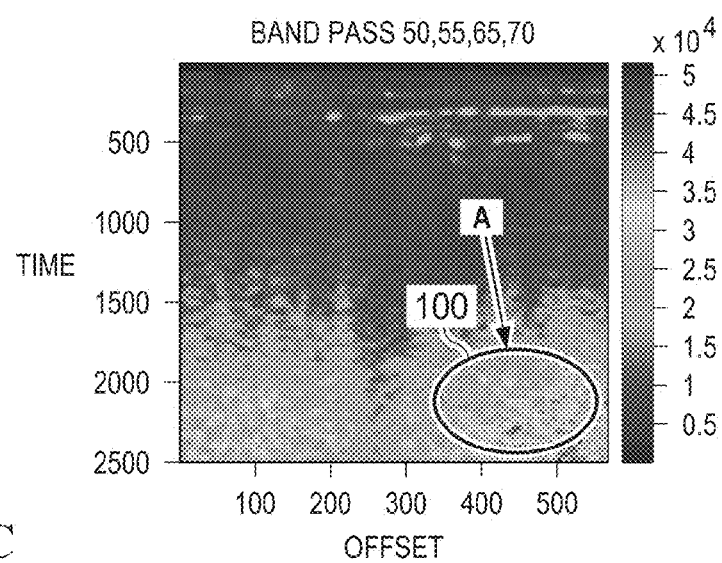
Figure 5C:
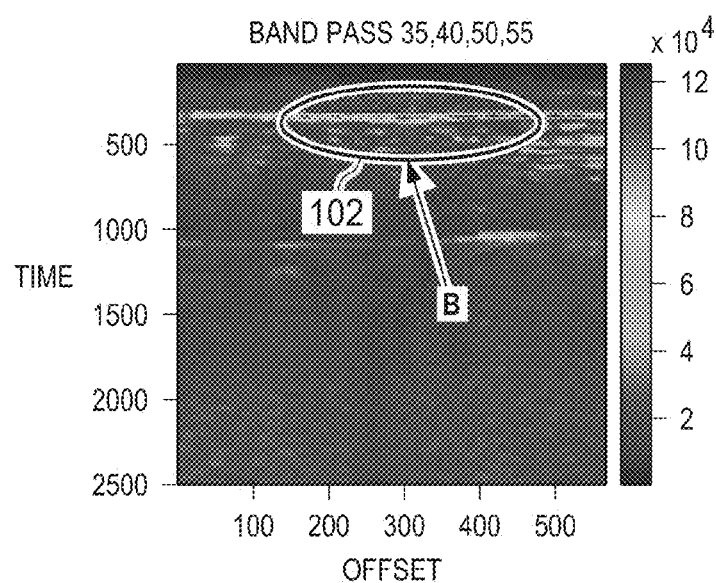
Figure 5D:
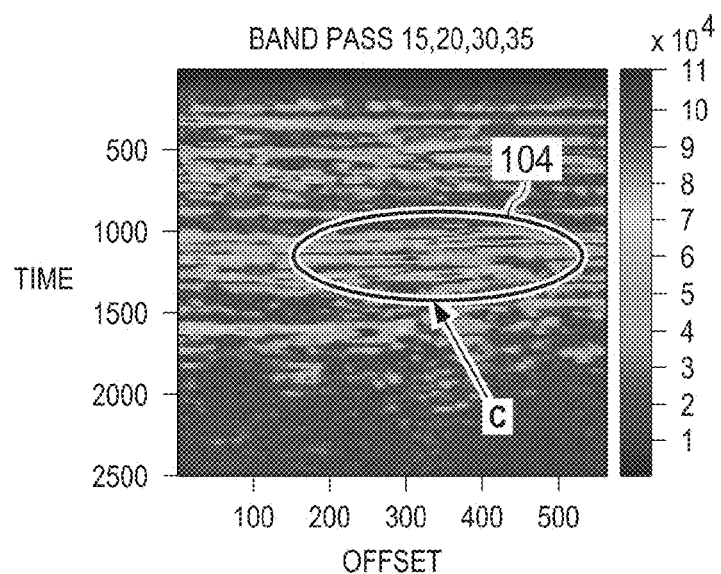

FIG. 5A is a plot of a seismic sub-line cut from a center part of a large survey. Each trace is 5 seconds long sampled at 2 ms. The trace separation is 25 m, thus 566 traces represent about 1.4 km in the data displayed in FIG. 5A.

Figure 5E:
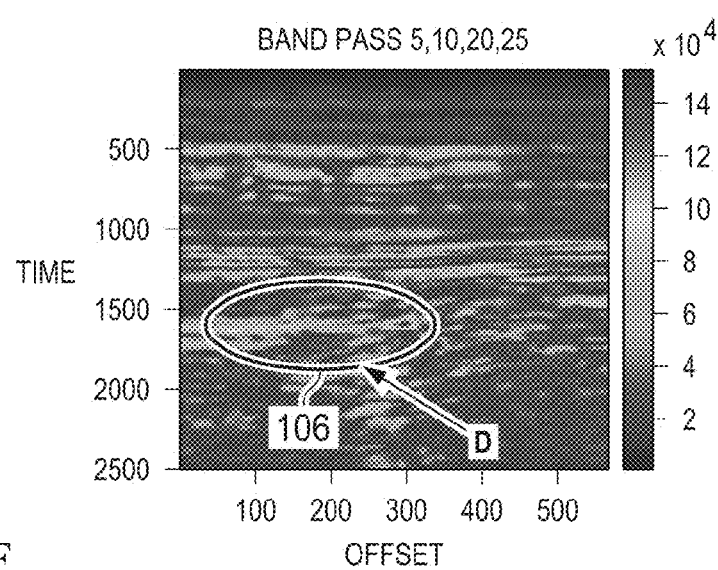

The data shown in FIG. 5A is filtered into four frequency bands: high frequency, 50-55-65-70 Hz (FIG. 5B); medium high, 35-40-50-55 Hz, (FIG. 5C); medium frequency, 20-25-35-40 Hz, (FIG. 5D); and low frequency, 5-10-20-25 Hz, (FIG. 5E). Hilbert transform processing is used to compute the amplitude of the complex traces in the data. Each frequency band is then treated as an attribute.

The amplitude of each frequency band is then scaled into one byte resolution of eight bits (a data range of 0-255), and each byte assembled into an integer in the manner described above, with higher frequencies band at higher ordered byte positions in the integer. Individual events 100, 102, 104, and 106 are highlighted in FIGS. 5B, 5C, 5D, and 5E respectively.

Figure 5F:
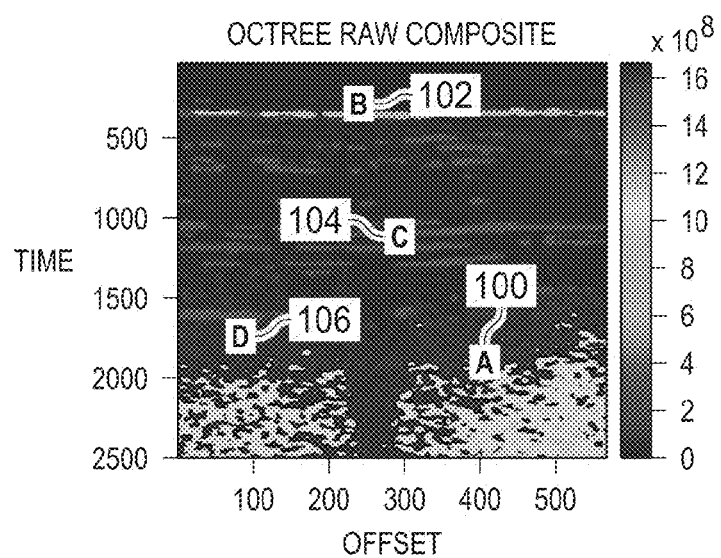
Figure 5G:
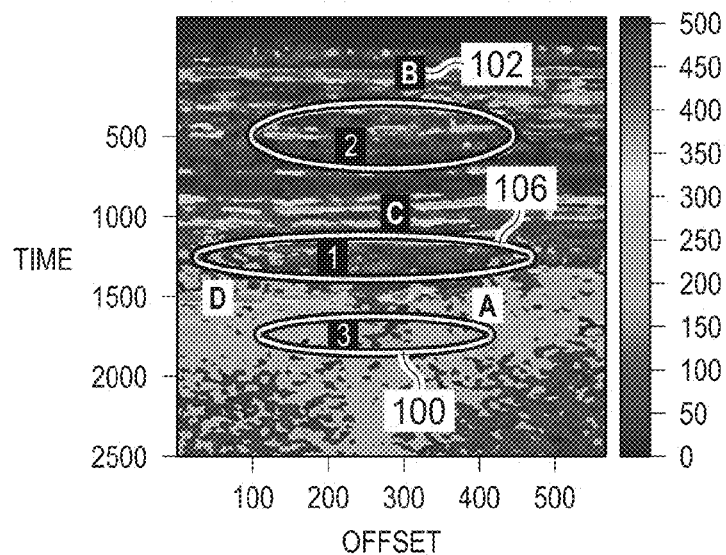
Figure 5H:
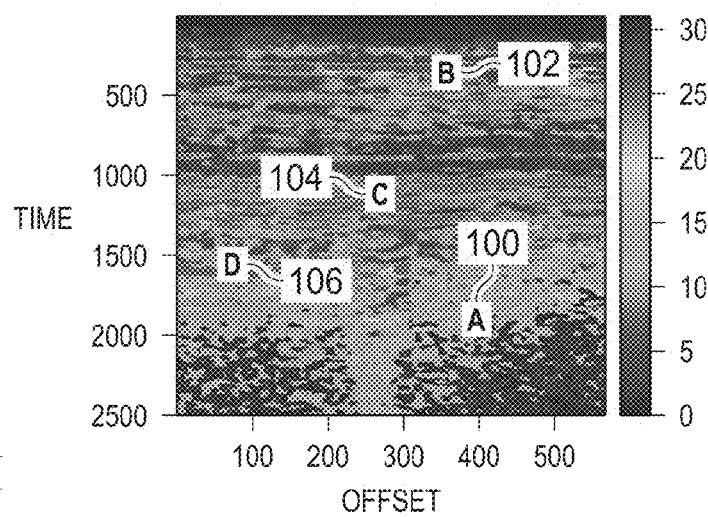

FIG. 5F is the composed image of the four frequency band attributes in an original number before processing of $256^4$ or $4.29 \times 10^9$ data groups. It is to be noted that events 100, 102, 104, and 106 from the four different individual frequency band attributes data of FIGS. 5B through 5E can be seen in FIG. 5F. The result of reducing the data groups to 512 are shown in FIG. 5G, with events 100, 102, 104, and 106 being clearly outlined. Further, after reducing the data group from 512 to 32 (FIG. 5H) and to 16 (FIG. 5I), the major events and thin layers that exist in FIGS. 5C, 5D, 5E, 5F can be seen to have been maintained. Comparing FIG. 5G to FIG. 5I, it is evident that after reducing data groups to 16, zones 102, 104, and 106 are more uniform and clean, and all major geo-bodies remain present.

It can be seen that the present invention is thus capable of identifying more than three events in a composite image when only one appears in each of four separate data attributes. The present invention also is capable of preserving thin-bed layers while performing its processing of input attribute data. Further, the results of the present invention reveal only major common geo-bodies by reducing data groups.

Figure 5I:
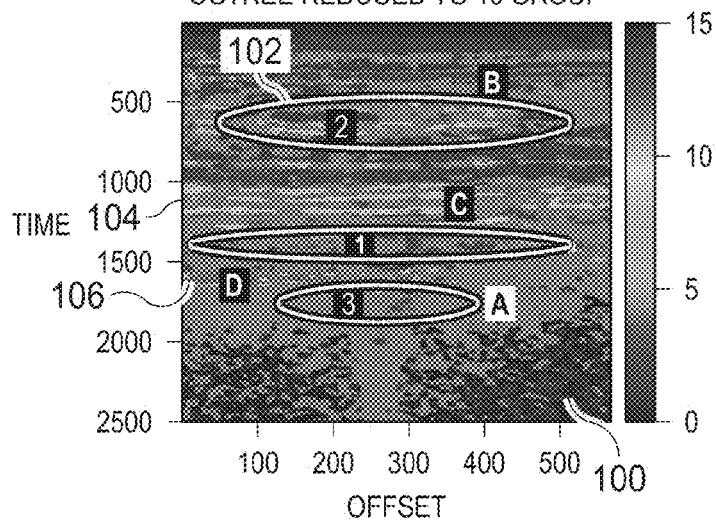

The present invention can provide composite images of merged or combined multiples of four or more individual input attributes and preserve the major targets of individual attributes. The present invention further enhances the image while maintaining small local variations. The data storage size requirements for an image of the data displayed in FIG. 5I is dramatically smaller than the size of that of FIG. 5F.

Example—Well Log Data

Figure 6:
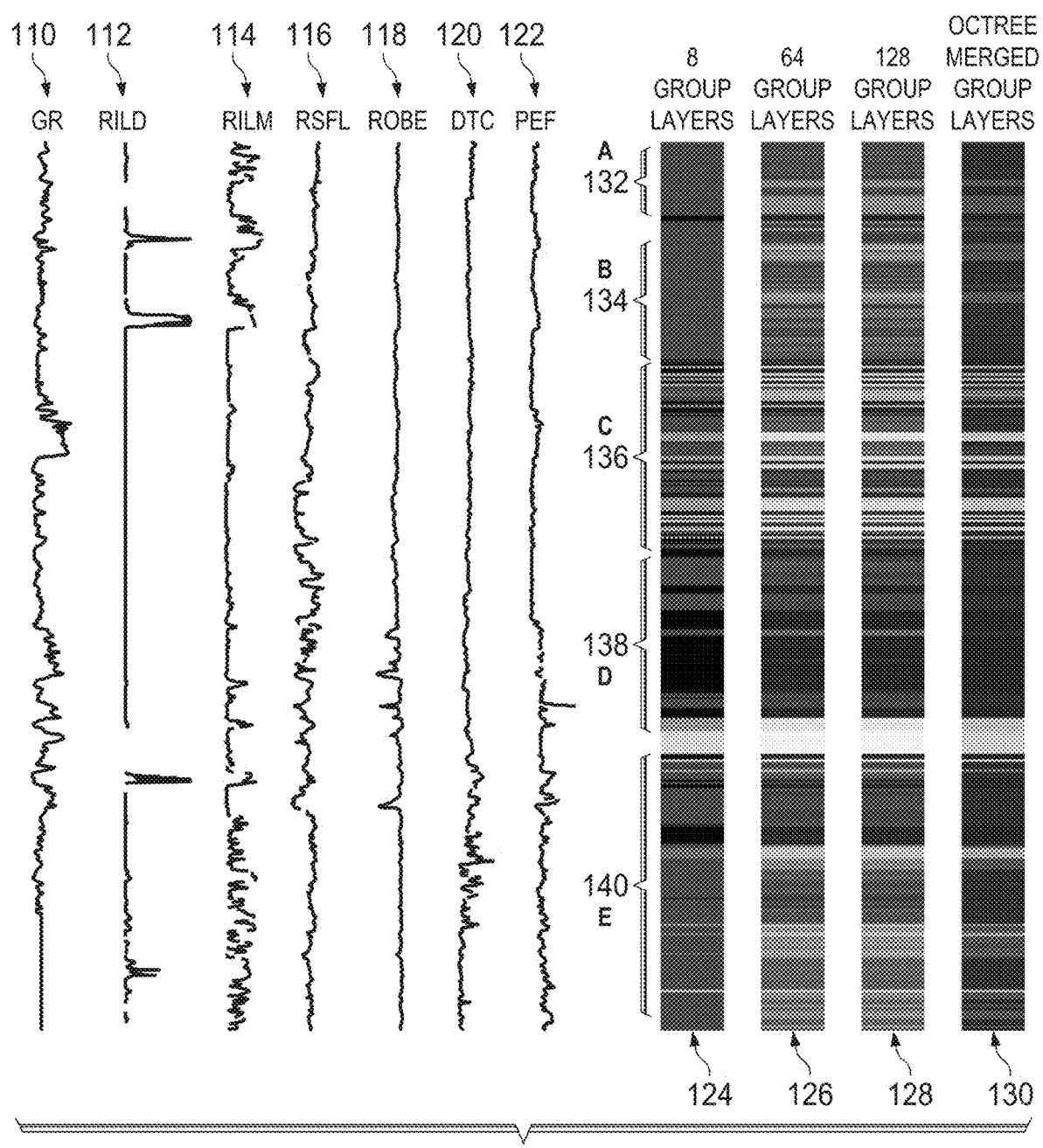
FIG. 6 is a plot of various well log data and processing results of that data according to the present invention.

In the example of FIG. 6, seven well logs 110, 112, 114, 116, 118, 120, and 122 are selected from a segment of 3404 feet of a string well log dataset. The well logs plotted in FIG. 6 represent different physical measurements including gamma ray or GR log 110; electric conductivity, or RILD, RILM, and RSFL logs 112, 114 and 116, respectively, with three penetrating powers; density or ROBE log 118, slowness or DTC log 120 and porosity or PEF log 122.

The extended quantization processing methodology of the present invention was applied to all data of the logs, each as a separate input attribute. Columns 124, 126 and 128 represent data groups when reduced to 128, 64, and 8 colors respectively from original data groups 130 by processing according to the present invention. The portions of log depths plotted in columns 124, 126 and 128 of FIG. 6 run for a portion of 400 feet from 9670 to 10700 feet, at half foot intervals. FIG. 6 indicates that the composite of data from seven well logs does delimitate multiple layers, that enhanced quantization and reduction according to the present invention preserves and enhances major events with less distraction as shown at zones of 132, 134, 136, 138, and 140 when comparing 8 data groups to 512 or the raw composite image 130.

3D Seismic Attributes Example: Channel Enhancement

Figure 7A:
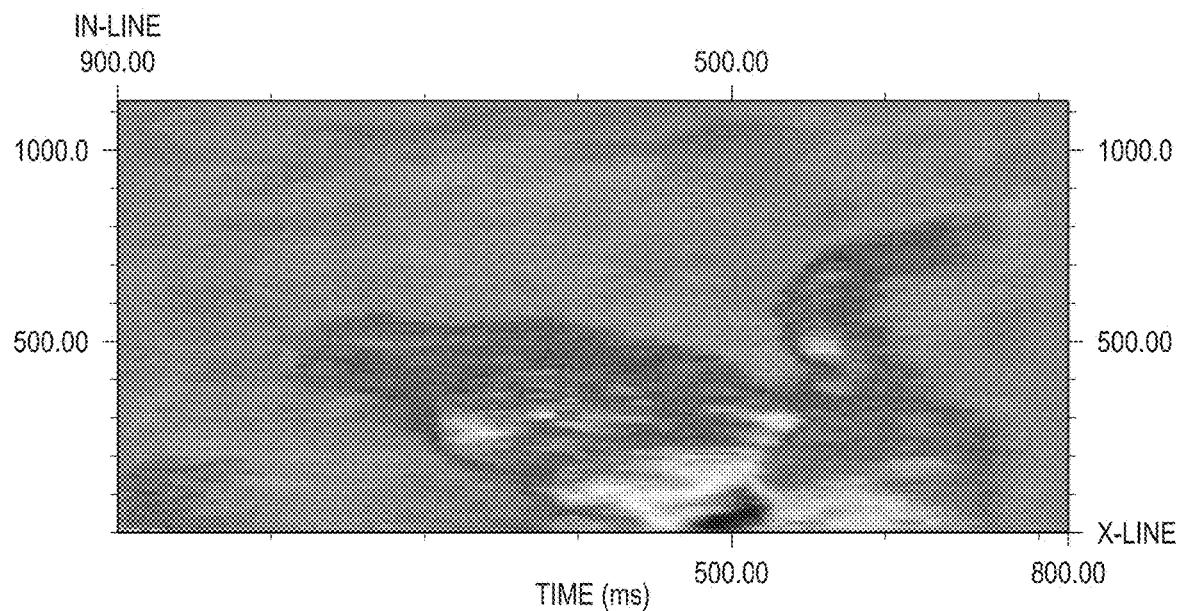
FIGS. 7A, 7B, 7C, 7D, 7E, 7F and 7G are displays of three-dimensional or 3-D seismic attributes and processing results of that data according to the present invention.
Figure 7B:
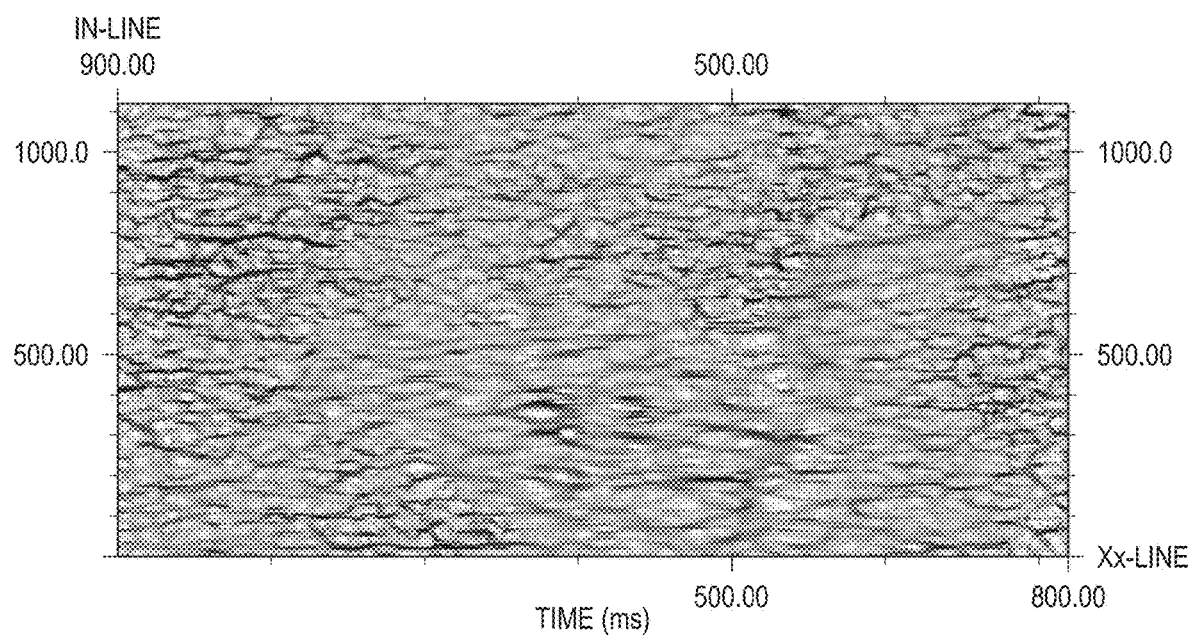
Figure 7C:
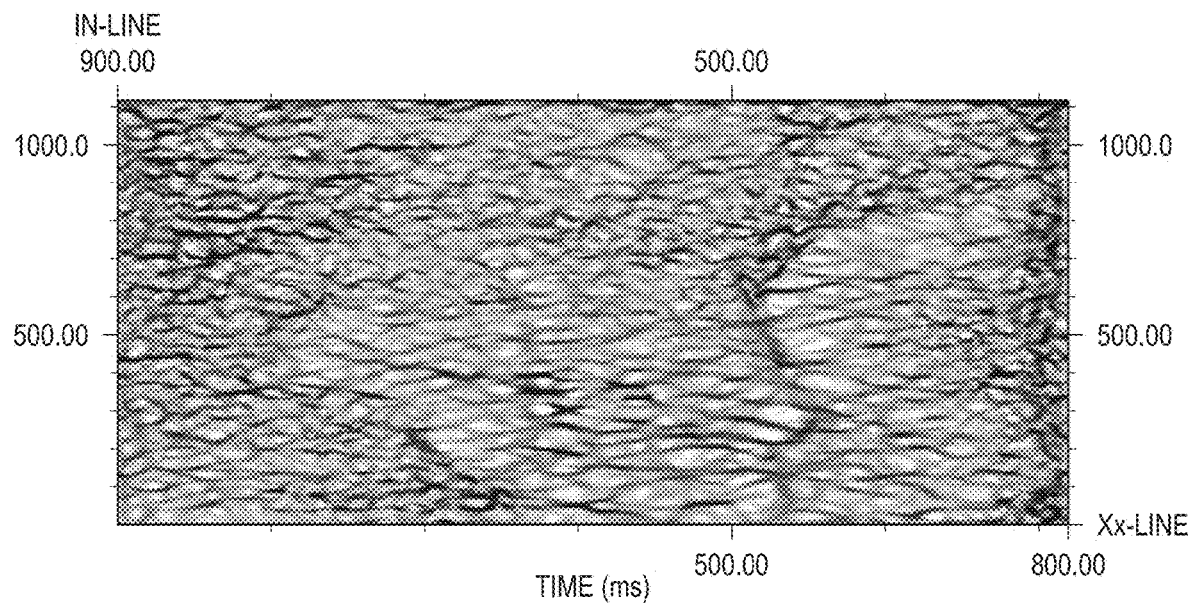
Figure 7D:
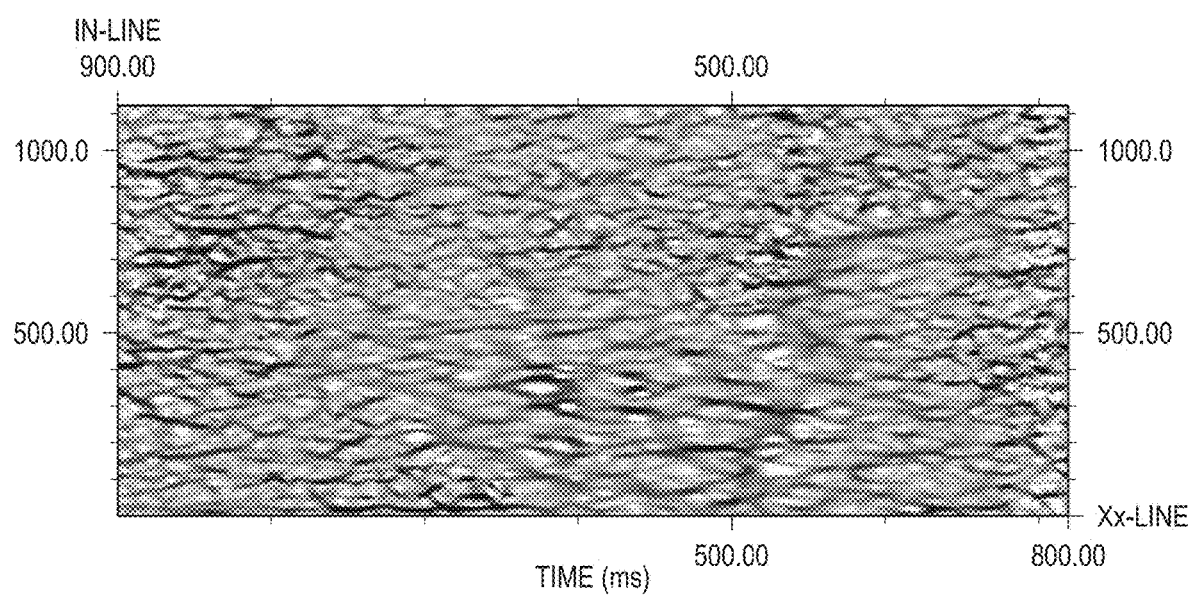
Figure 7E:
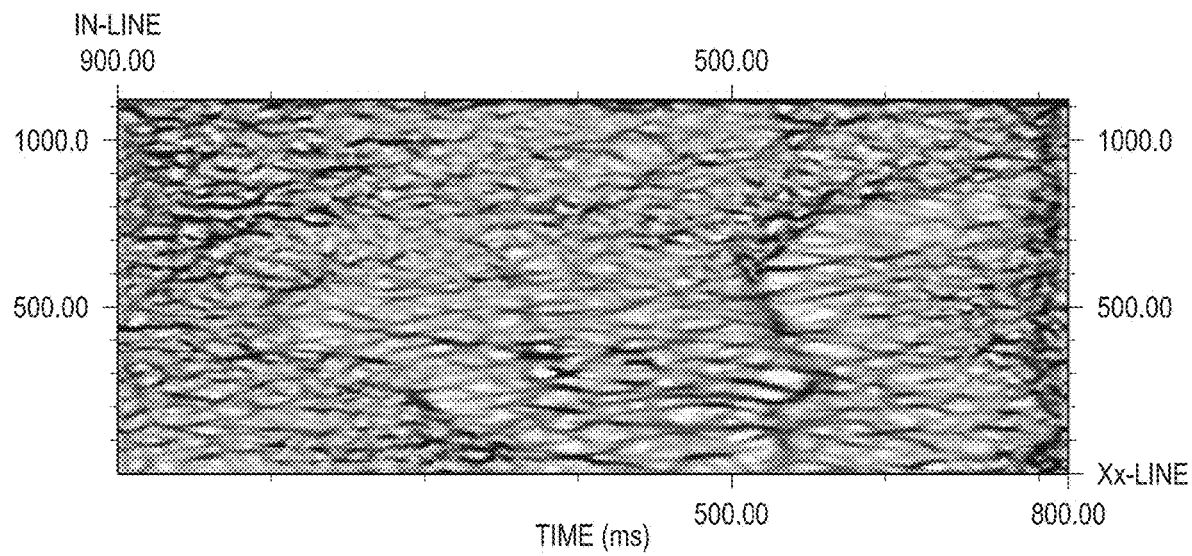
Figure 7F:
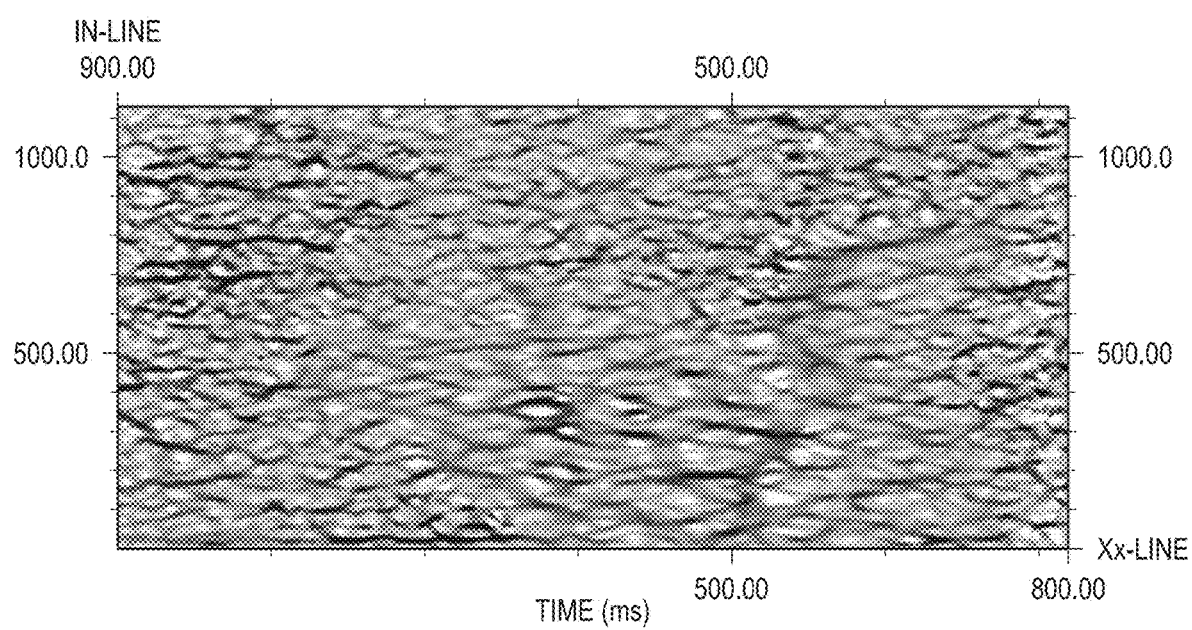

FIG. 7A is a raw seismic amplitude time slice of an actual post-stack 3D seismic survey with a sub-line ranging from 1 to 1129 and a cross-line from 101 to 720, with increments of 2, and a time from 0 to 600 milliseconds with sample rate of 2 millisecond being used. FIGS. 7B through 7F are plots of scaled curvature attributes extracted from the seismic data shown in FIG. 7A for processing according to the present invention. The five scaled curvature attributes (scale 1, 3, 5, 7, 9 for FIGS. 7B, 7C, 7D, 7E and 7F, respectively) are extracted from seismic amplitude in the post-stack 3-D seismic survey data.

The extraction of curvature attributes may be performed, for example, according to: "Curvature Attributes and Their Application to 3D Interpreted Horizons", First Break, Volume 19, Issue 2, pp. 85-100, February, 2001, Roberts or "Seismic Curvature Attributes for Mapping Faults/Fractures and Other Stratigraphic Features", CSEG Recorder 41, November, 2007, Satinder et al.

Figure 7G:
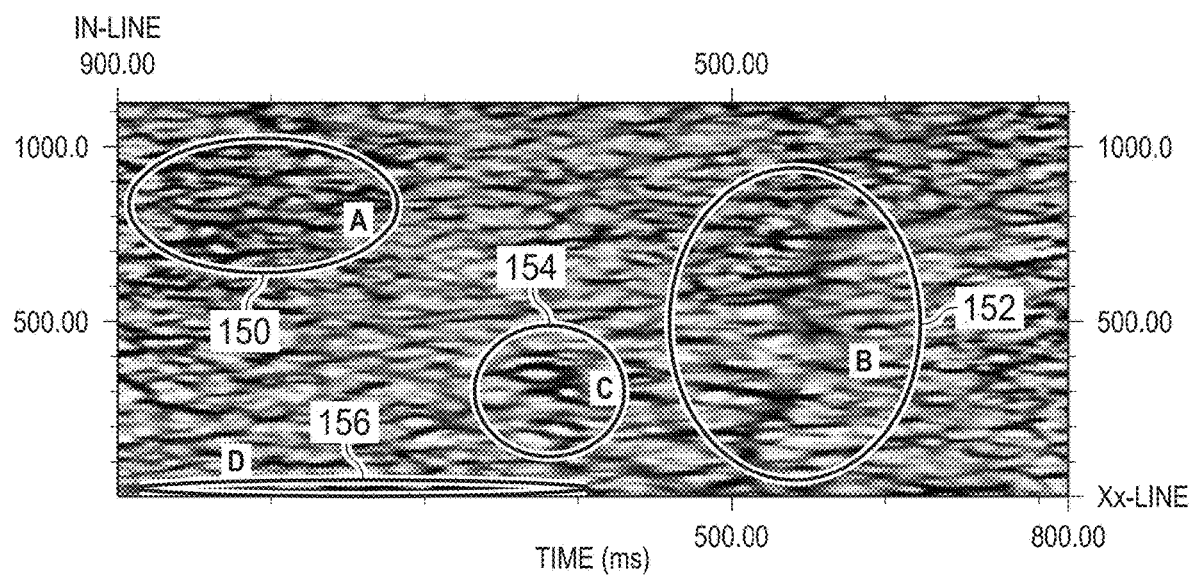

Extended quantization processing according to the present invention is then applied in the manner described above to combine the five scaled curvatures from the data displayed in FIG. 7B through FIG. 7F. A time slice section at 220 milliseconds is displayed in FIG. 7G to analyze the effect of extended quantization processing according to the present invention, and the results plotted as indicated in FIG. 7G. Interest zones are highlighted as 150, 152, 154 and 156 in FIG. 7G. It is noted that the channels at those zones are either blurred or dimmed on the scaled curvatures shown in FIGS. 7B through 7F. After processing according to the present invention, channels at interest zones are clearer and continuous in the combined multi-attribute display of FIG. 7G.

3D Seismic Attributes Example: Composite Image and Channel Enhancement

Figure 8A:
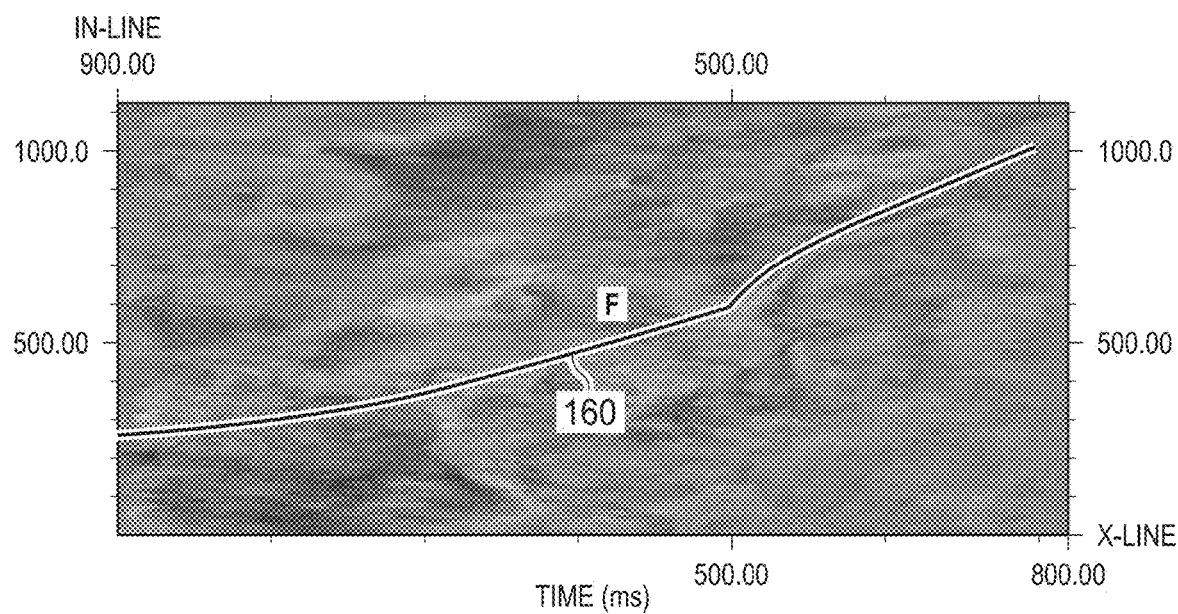
FIGS. 8A, 8B, 8C, 8D 8E, 8F, 8G, 8H and 8I are displays of seismic data and seismic attributes and processing results of that data according to the present invention.
Figure 8B:
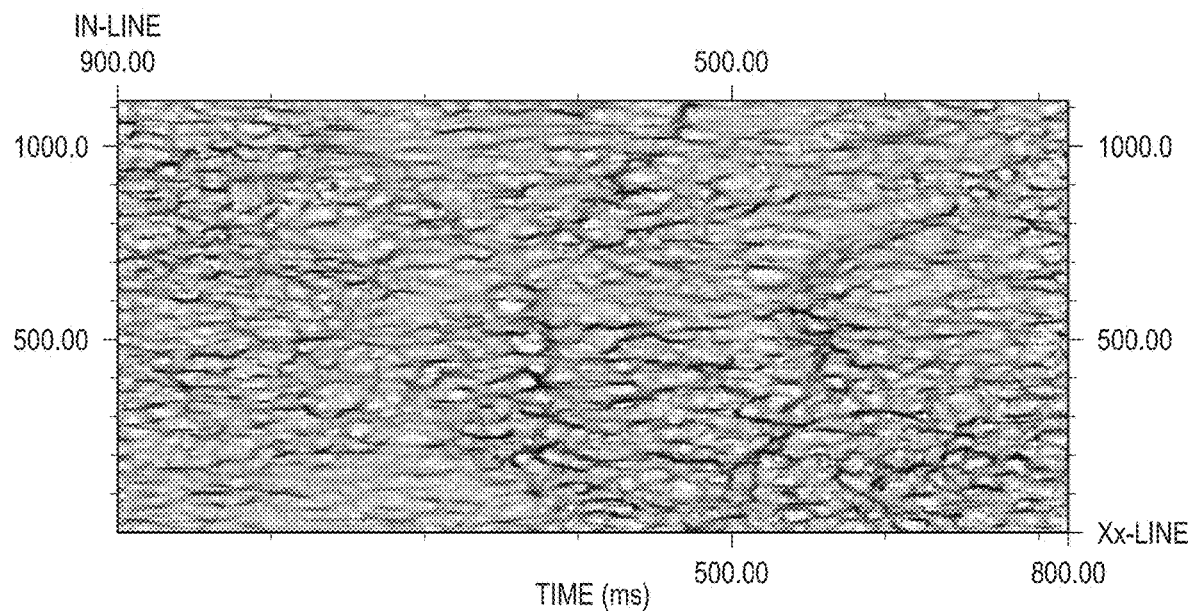
Figure 8C:
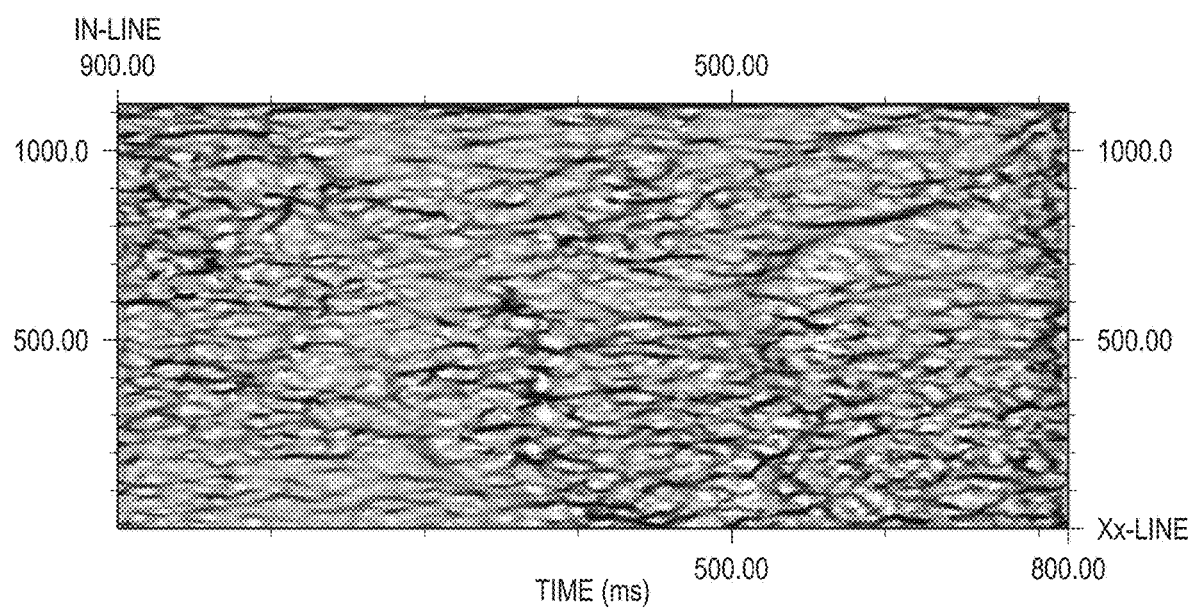
Figure 8D:
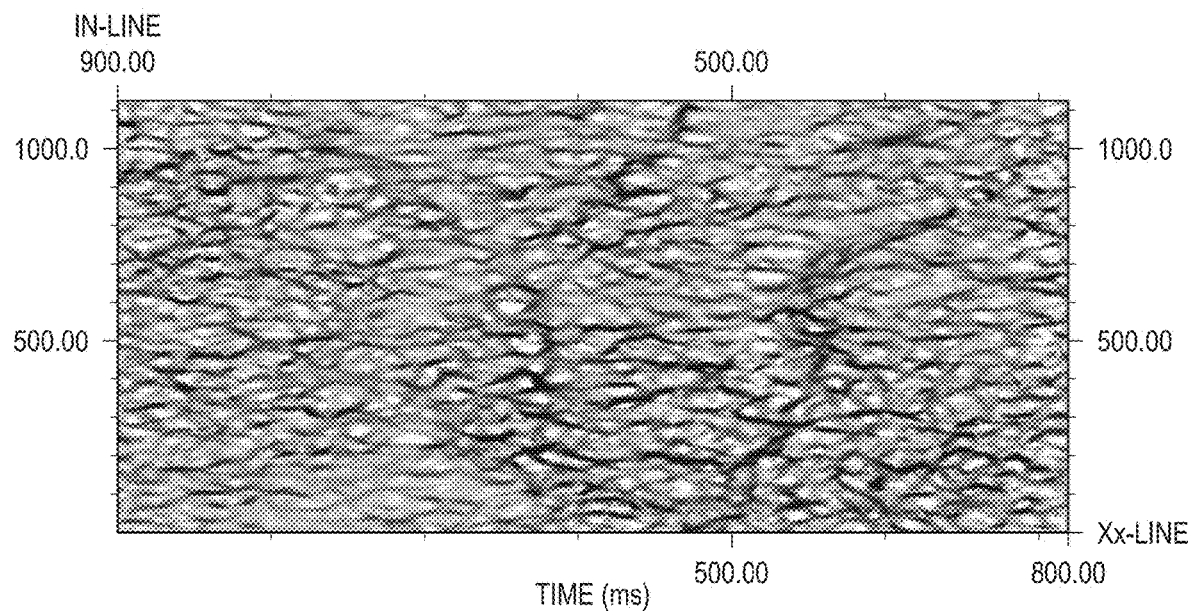
Figure 8E:
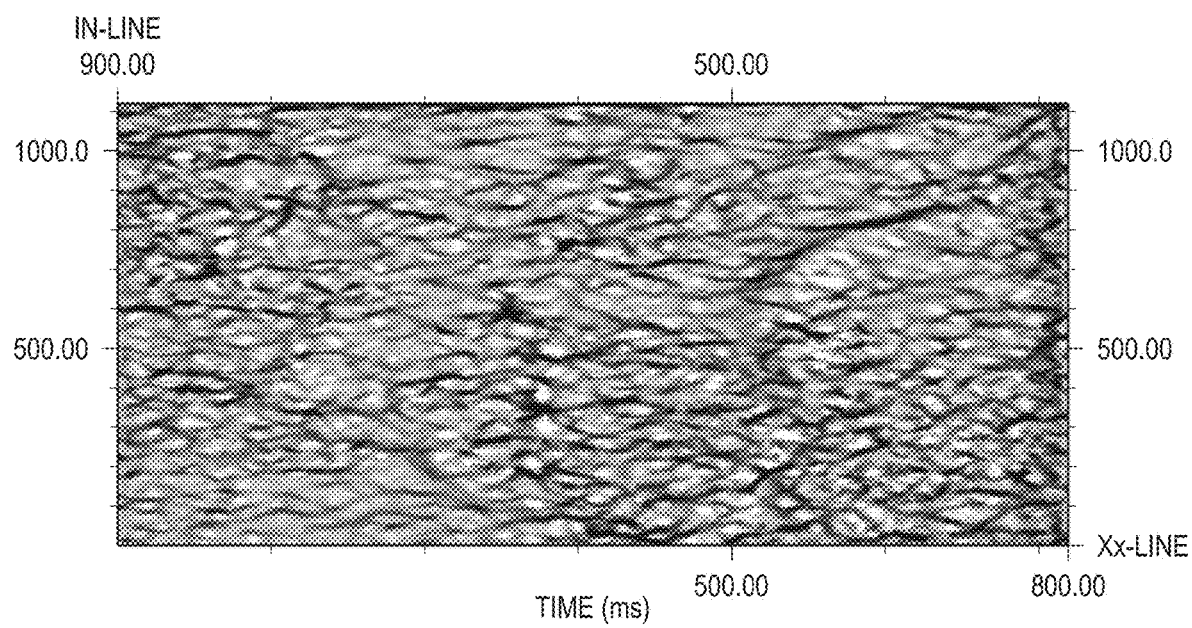
Figure 8F:
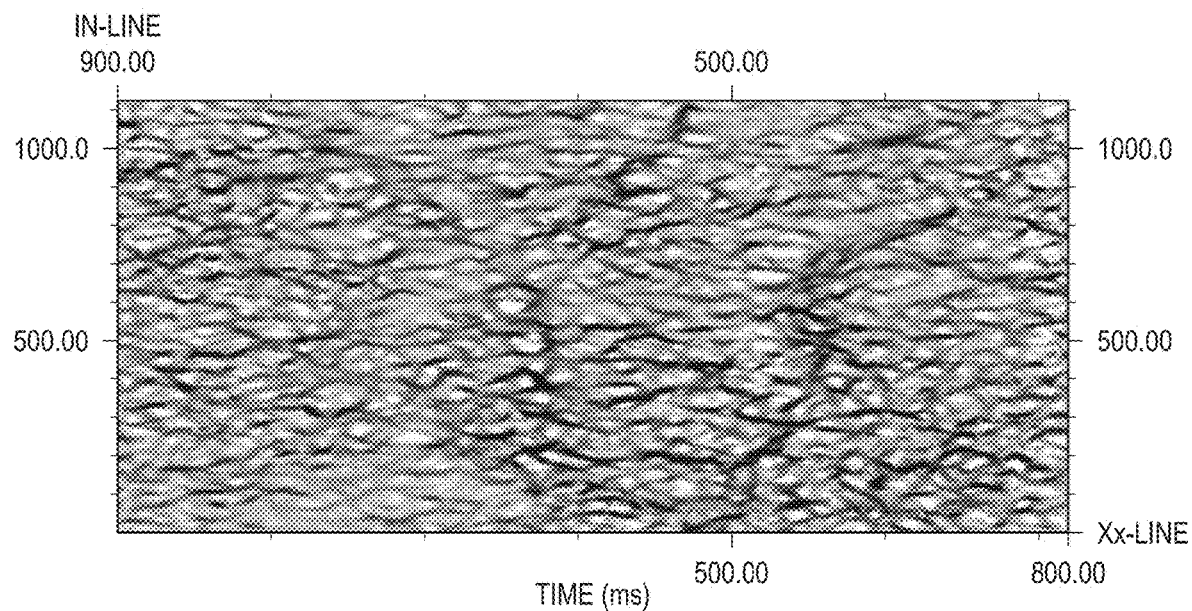

FIG. 8A is raw seismic slice from the same seismic survey as the data shown in FIG. 7A, but at a time slice of 416 milliseconds. Again, five scaled curvature attributes (scale 1, 3, 5, 7, 9 for FIGS. 8B, 8C, 8D, 8E and 8F, respectively) are extracted from seismic amplitude in the post-stack 3-D seismic survey data in the manner described above. It is noted that on raw seismic time slice plot of FIG. 8A, a possible channel is illustrated by line 160.

Figure 8G:
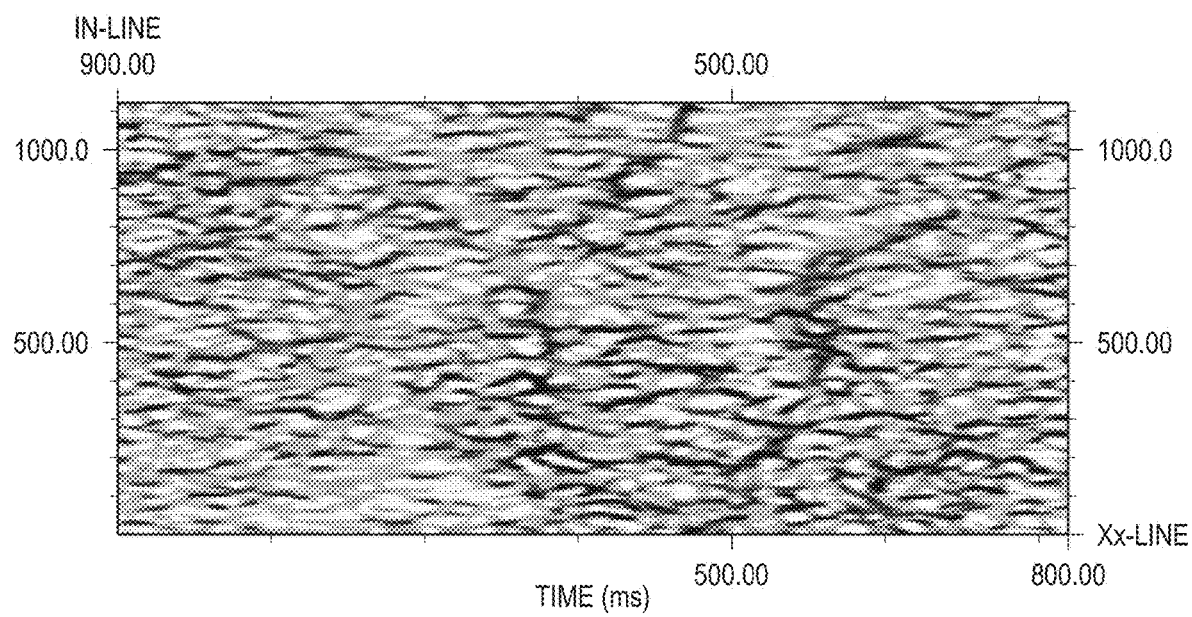

Extended quantization processing according to the present invention is then applied in the manner described above to combine the five scaled curvatures from the data displayed in FIG. 8B through FIG. 8F. FIG. 8G is a plot of the combined attributes from processing according to the present invention with a reduction to group 128. Zones of interest in FIG. 8G are circled and labeled as 162, 164, 166, 168 and 170 in FIGS. 8H and 8I.

Figure 8H:
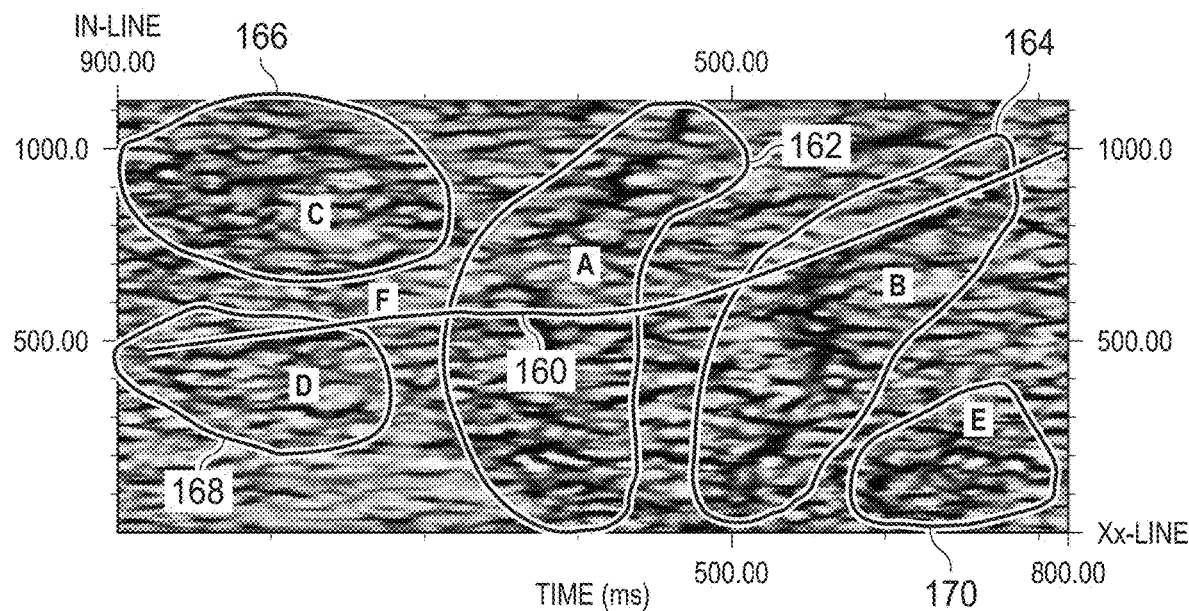
Figure 8I:
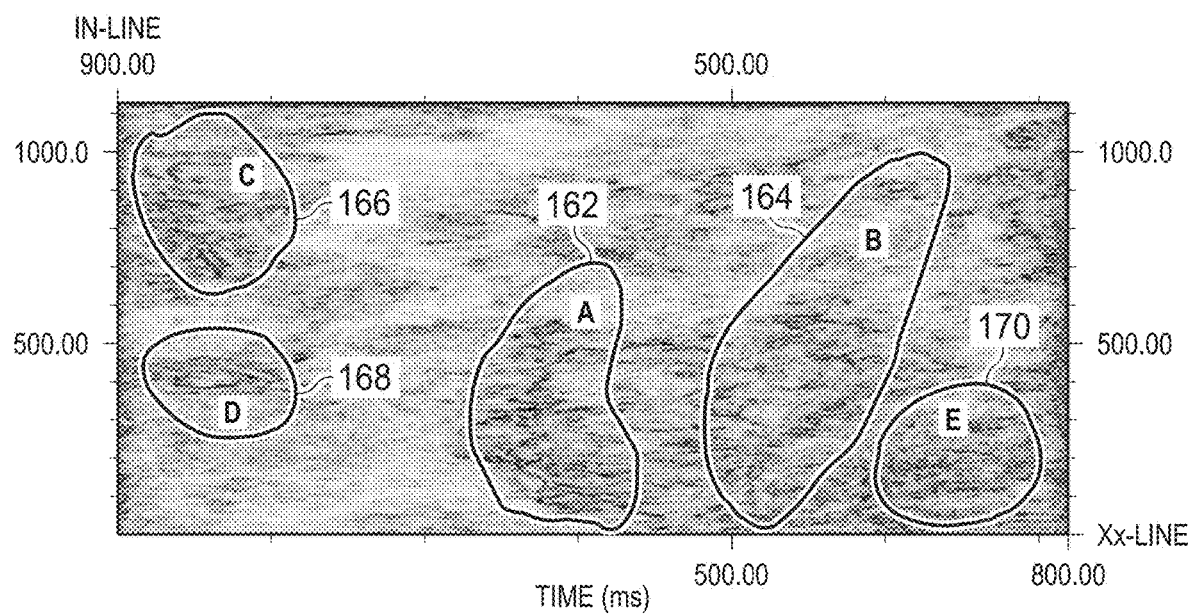

Though channels in individual scaled curvatures are not as blurred as the Example of FIG. 8G described above, their presence in the data can be further enhanced by extended quantization composite FIG. 8H and extended quantization reduction FIG. 8G. It is to be noted that the highlighted channel 160 (FIG. 8A) and four zones of interest (FIG. 8H) are much evident and match the data of other attributes, such as coherency shown in FIG. 8I.

Example: Combining Attributes and Preserving Geological Features

Usually, the seismic attributes of coherency, dip, local azimuth and local frequency are some of the most frequently used attributes to analyze geological channels and structures. These four attributes were combined using the extended quantization processing methodology according to the present invention to form a composite image that contained abnormalities indicated in various ones of the maps or plots of individual attributes.

Figure 9A:
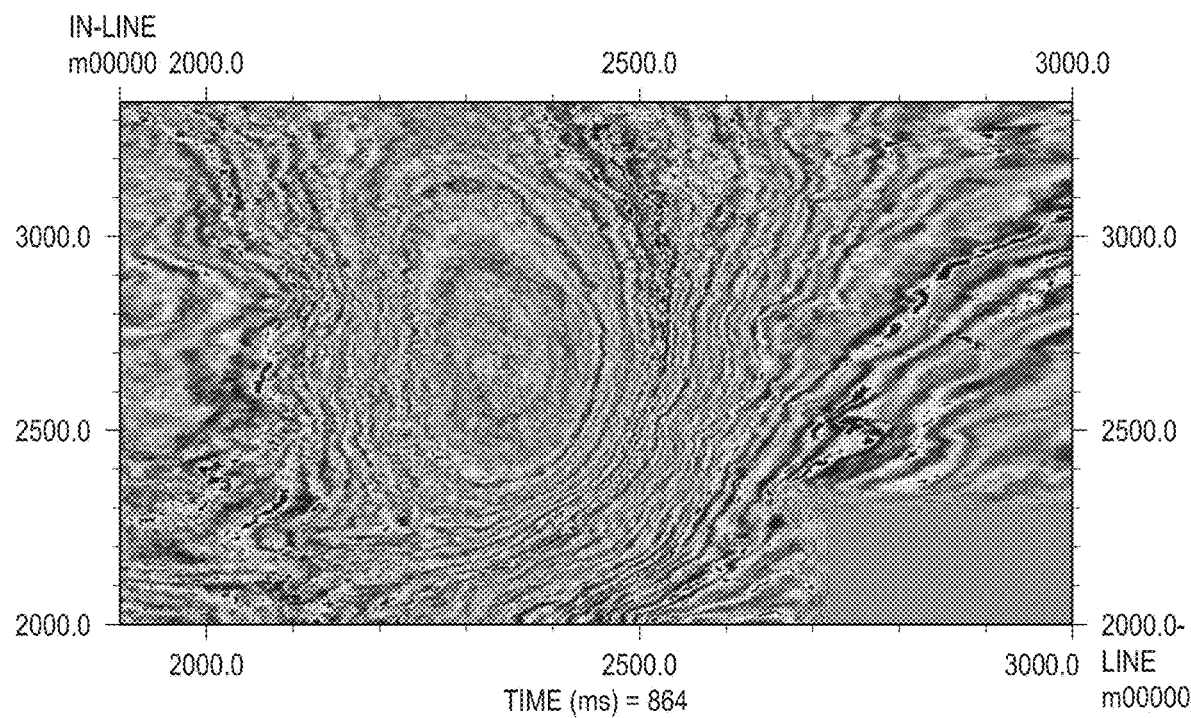
FIGS. 9A, 9B, 9C, 9D, 9E, and 9F are displays of are displays of seismic data and seismic attributes and processing results of that data according to the present invention.
Figure 9B:
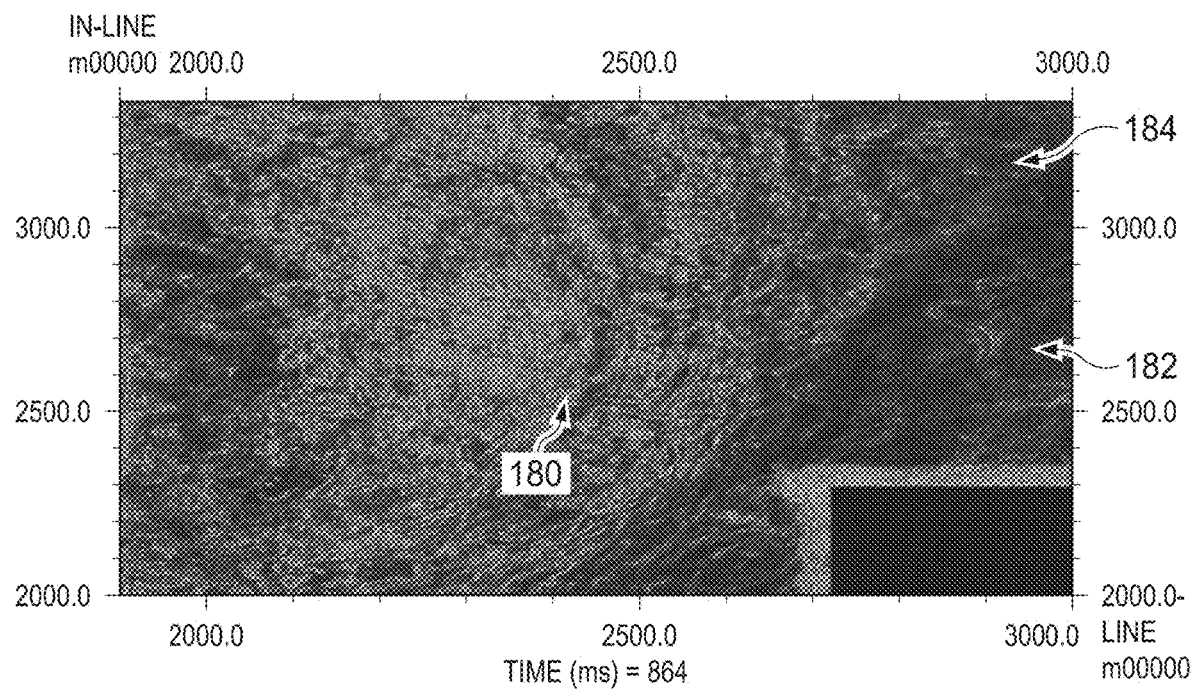
Figure 9C:
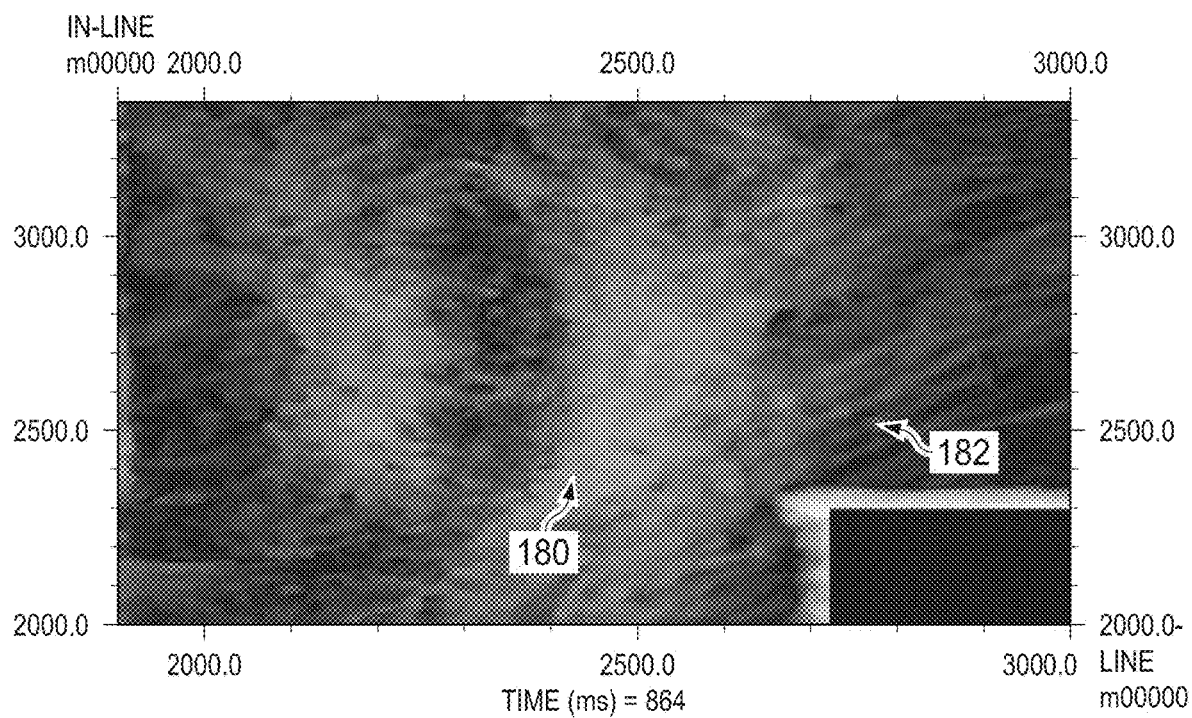
Figure 9D:
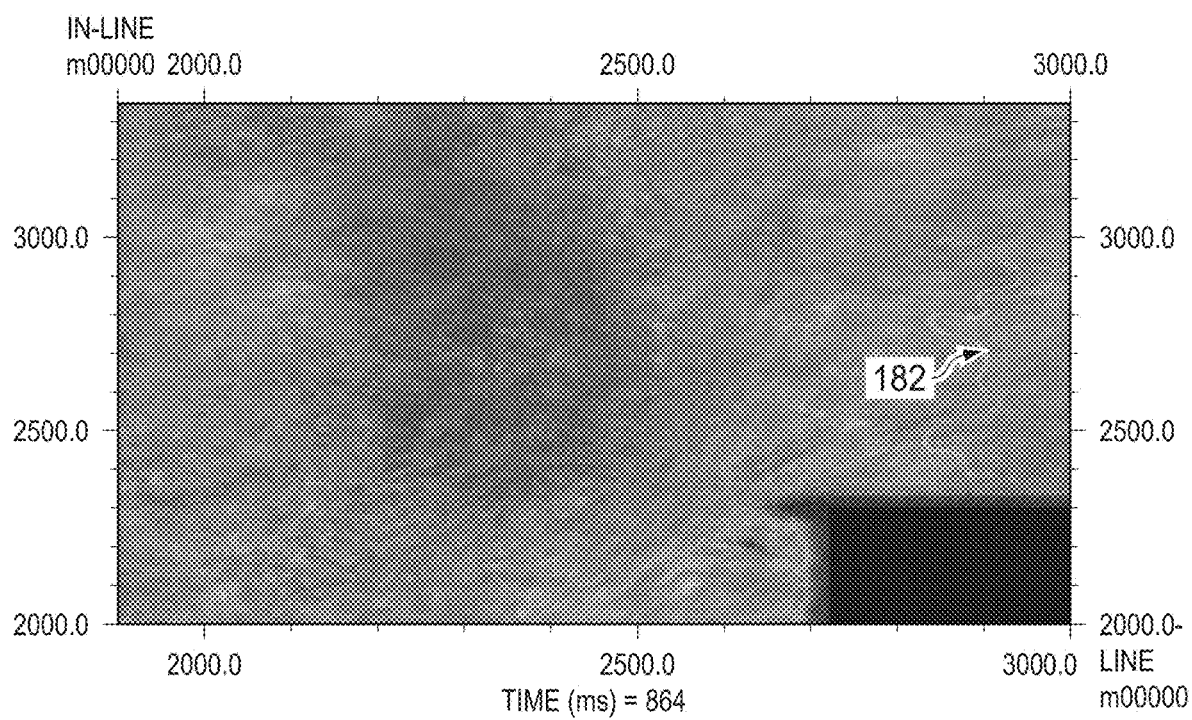
Figure 9E:
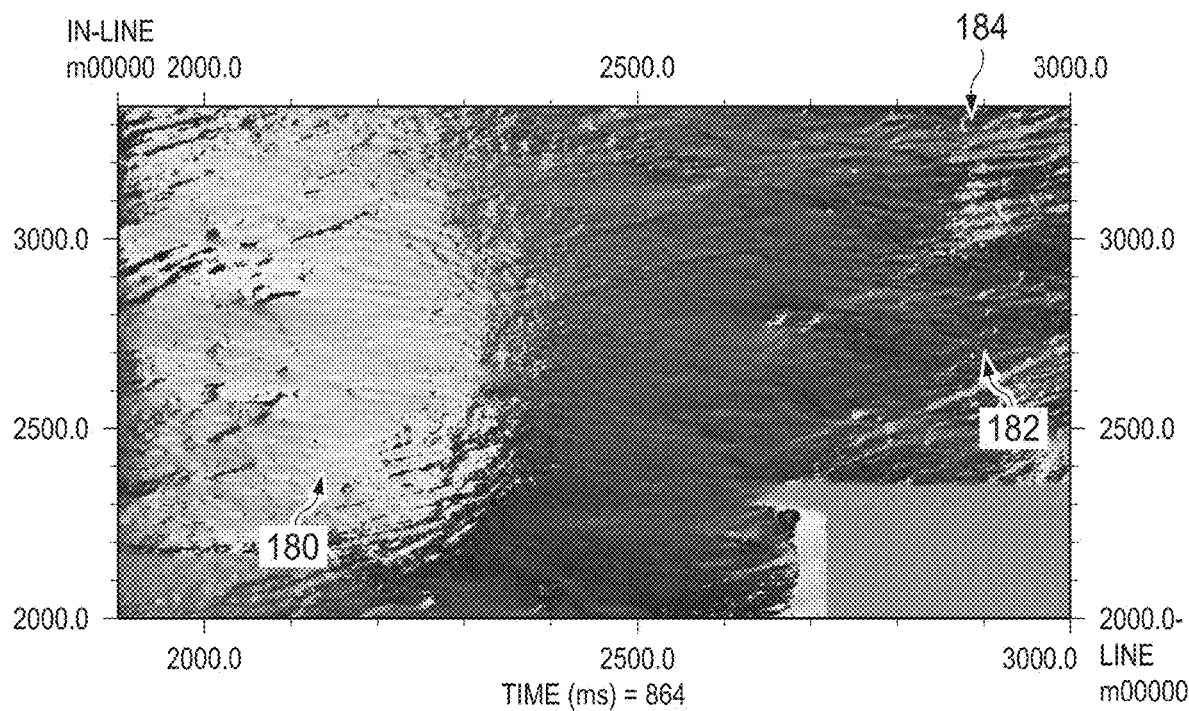
Figure 9F:
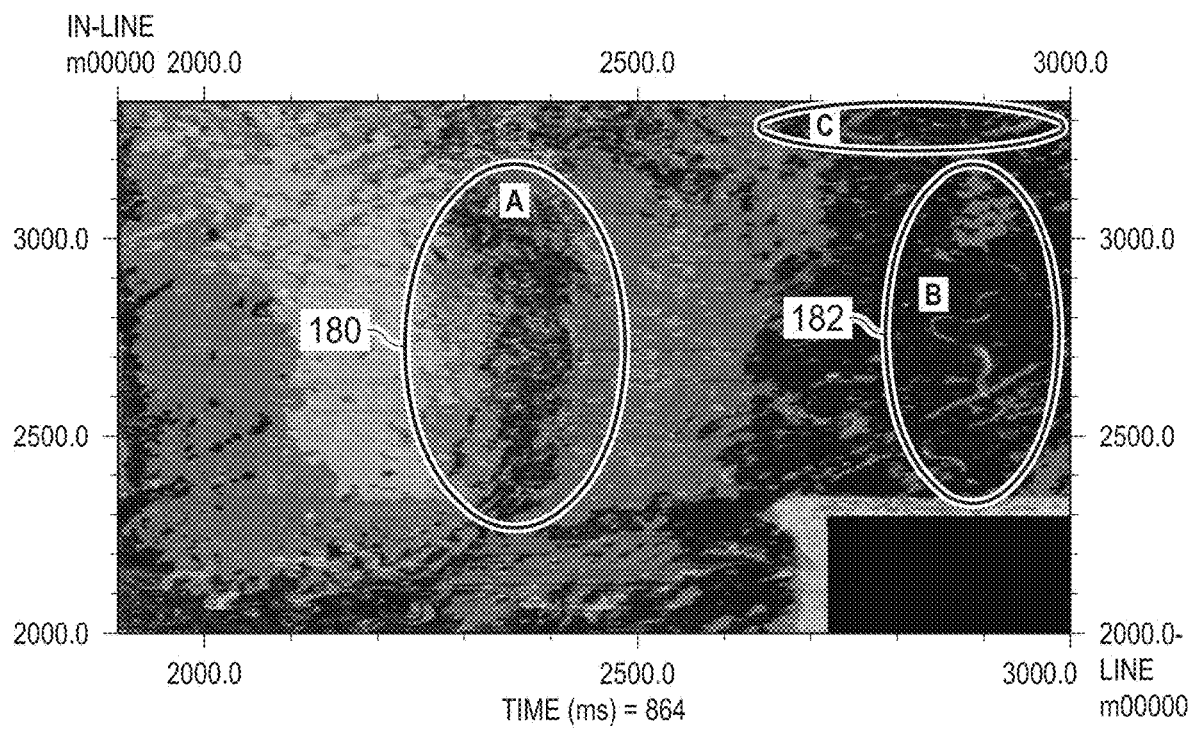

There was interest in also determining and whether further enhancement in the combined processing results of the geo-bodies or channels that were indicated present in certain of the individual attribute maps. The example was based on a post-stack 3D seismic survey having a sub-line from 2000 to 3350; a cross-line from 1900 to 3000 with time from 0 to 1000 MS, the sample rate is 2 MS. The time slice section at 864 milliseconds was investigated and the results are shown in FIGS. 9A through 9F. FIG. 9A is a raw seismic time slice. FIG. 9B is a display of a coherence attribute formed by processing the data of FIG. 9A. FIG. 9C is a plot of the dip attribute for the data of FIG. 9A, while FIG. 9D is a plot of the local frequency attribute, and FIG. 9E is a plot or map of the local azimuth attribute for the same data. FIG. 9F is a plot of the results of the processing methodology of the present invention on the same data, reducing to group 128.

Three interest zones 180, 182 and 184 are indicated in FIG. 9F. Zone 184 shown in FIG. 9F also appears in the coherence attribute plot (FIG. 9B), the dip map attribute plot (FIG. 9C) and the local azimuth attribute plot (FIG. 9E). Channel indicated zone 182 of FIG. 9F appears partially in plots of the four individual input attributes (FIGS. 9B through 9E), but with dimmed display. The small channel in zone 184 of FIG. 9F can barely be seen in the local azimuth attribute (FIG. 9E) and the coherence (FIG. 9B) maps. Processing the input attribute data according to the present invention, restructuring was applied to combine the data of the four individual input attributes, followed by reduction to 128 data groups with two averaging sequences. Zones 180, 182, and 184 are readily apparent in the processed combined data image in FIG. 9F, with enhanced image quality.

It should be understood that the examples given above of surface seismic data (FIGS. 5A through 5I); well log data (FIG. 6); 3D seismic attributes (FIG. 7A through 7G and FIGS. 8A through 8I); and combining attributes (FIGS. 9A through 9F) are presented as illustrative of the types of geophysical data which can be processed according to the present invention. As used in the context of the present invention, geophysical data should be understood to include reflection seismic attributes, well log data and or any other kind of data measurements regarding subsurface features of interest for geological interpretation that can be combined together such as: resistivity data, gravity and magnetic data, provided such data can be scaled into one byte to be put into the data structure described above.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method, performed in a computer system comprising a memory, a processor and a user display, of forming with the computer system a merged color image having only three component colors representing at least four geophysical attributes regarding subsurface features of interest for geological interpretation of subsurface formations, the merged color image representing a the least four geophysical attributes in the area of geological interest and preserving the character of each of the at least four geophysical attributes, the method comprising the computer processing steps of:

storing in the memory computer operable instructions causing the computer system to form the merged color image of at least four geophysical attributes regarding the area of geological interest of the subsurface reservoir;

performing in the computer system, under control of the stored computer operable instructions, steps of forming the merged color image of the at least four geophysical attributes, comprising:

(a) receiving in the memory input values of the at least four geophysical attributes in digital format for the at least four geophysical attributes in the area of geological interest;

(b) scaling with the processor the received digital format input values for the at least four geophysical attributes into data bytes of equal data bit range representing scaled values of the at least four geophysical attributes;

(c) converting with the processor the data bytes resulting from scaling the digital format input values for the at least four geophysical attributes into merged serialized bit structures by performing a bit matrix serialization and transposition of the bits of the data bytes;

(d) sorting with the processor the merged serialized bit structures into integer order to form a plurality of data points, each of the formed plurality of data points representing a numerical value of merged attribute data of one of the merged serialized bit structures;

(e) grouping together with the processor data points representing the same numerical value of merged attribute data;

(f) determining with the processor reduction criteria for the groups of data points, wherein the reduction criteria is based on: (1) the data size of groups representing the same numerical value of merged attribute data; and (2) dissimilarity of a group from neighbor groups;

(g) sorting with the processor the groups of data points in numerical order of the determined reduction criteria, wherein the determined reduction criteria is based on at least one of (1) the data size of groups representing the same numerical value of merged attribute data; and dissimilarity of a group from neighbor groups;

(h) determining with the processor a set size indicating a specified number of the groups of data points for output display;

(i) merging together with the processor groups of data points based on the determined reduction criteria;

(j) determining with the processor whether the number of merged groups of data points after merging matches the determined set size indicating the specified number of the merged groups of data points for output display; and (k) if not, go to step (f) and repeat the process of updating reduction criteria for the groups of data at step (f), sorting at step (g), determining at step (h), merging at step (i) and determining at step (i); and (l) if so, sorting into the original integer order the merged group of data points of the determined set size and satisfying the determined reduction criteria;

(m) storing in the memory the original integer order sorted groups of data points of the determined set size and satisfying the determined reduction criteria; and (n) forming with the user display an output display of the original integer order sorted groups of data points representing in the three component colors the at least four geophysical attributes, the output display satisfying the determined reduction criteria and preserving the character of each of the at least four geophysical attributes.

2. The computer implemented method of claim 1, wherein the geophysical attributes comprise seismic attributes.

3. The computer implemented method of claim 2, wherein the seismic attributes are selected from the group consisting of frequency band, curvature, coherency, dip, local frequency, and local azimuth.

4. The computer implemented method of claim 1, wherein the geophysical attributes comprise well log attributes.

5. The computer implemented method of claim 4, wherein the well log attributes are selected from the group consisting of gamma ray logs, electrical conductivity logs, density logs, slowness logs, and porosity logs.

6. The computer implemented method of claim 1, wherein the step of converting with the processor the data bytes resulting from scaling comprises converting the data bytes further includes assembling the scaled data bytes into integers from higher order to lower order based on the importance of the attributes for purposes of interpretation.

7. A data processing system for forming a merged color image having only three component colors representing at least four geophysical attributes regarding subsurface features of interest for geological interpretation of subsurface formations the merged color image representing the least four geophysical attributes in the area of geological interest and preserving the character of each of the at least four geophysical attributes, the data processing system comprising:

(a) a memory storing computer operable instructions causing the data processing system to form the merged color image of at least four geophysical attributes regarding the area of geological interest of the subsurface reservoir;

(b) a processor performing under control of the stored computer operable instructions to form the merged color image by performing the steps of:

(1) receiving input values of the at least four geophysical attributes in digital format for the at least four geophysical attributes in the area of geological interest;

(2) scaling the received digital format input values for the at least four geophysical attributes into data bytes of equal data bit range representing scaled values of the at least four geophysical attributes;

(3) converting the data bytes resulting from scaling the digital format input values for the at least four geophysical attributes into merged serialized bit structures by performing a bit matrix serialization and transposition of the bits of the data bytes;

(4) sorting the merged serialized bit structures into integer order to form a plurality of data points, each of the formed plurality of data points representing a numerical value of one of the merged serialized bit structures;

(5) grouping together data points representing the same numerical value of the merged attribute data;

(6) determining reduction criteria for the groups of data points, wherein the reduction criteria is based on: (a) the data size of groups representing the same numerical value of merged attribute data; and (b) dissimilarity of the groups from neighbor groups;

(7) sorting the determined reduction criteria for the groups of data points in a numerical order of the determined reduction criteria, wherein the determined reduction criteria is based on at least one of (a) the data size of groups representing the same numerical value of merged attribute data; and (b) dissimilarity of the groups from neighbor groups;

(8) determining a set size indicating a specified number of the merged groups of data points for output display;

(9) merging together groups of data points based on the determined reduction criteria;

(10) determining whether the number of merged groups of data points after merging matches the determined set size indicating the specified number of the merged groups of data points for output display; and

(11) if not, go to step (6) and repeat the process of updating reduction criteria for the groups of data at step (6), sorting at step (7), determining at step (8), merging at step (9) and determining at step (10); and

(12) if so, sorting into the original integer order the merged group of data points of the determined set size and satisfying the determined reduction criteria;

(13) storing the original integer order sorted groups of data points of the determined set size and satisfying the determined reduction criteria; and

(14) providing the stored original integer order sorted groups of data points of the determined set size and satisfying the determined reduction criteria as output data; and (c) the memory storing the original integer order sorted groups of data points satisfying the determined reduction criteria for the groups of data points; and (d) a user display forming an output image of the merged color image representing in the three component colors the at least four geophysical attributes, the displayed output image satisfying the determined reduction criteria and preserving the character of each of the at least four geophysical attributes.

8. The data processing system of claim 7, wherein the geophysical attributes comprise seismic attributes.

9. The data processing system of claim 8, wherein seismic attributes are selected from the group consisting of frequency band, curvature, coherency, dip, local frequency, and local azimuth.

10. The data processing system of claim 7, wherein the geophysical attributes comprise well log attributes.

11. The data processing system of claim 10, wherein the well log attributes are selected from the group consisting of gamma ray logs, electrical conductivity logs, density logs, slowness logs, and porosity logs.

12. The data processing system of claim 7, wherein processor in converting the data bytes resulting from scaling performs the step of converting the data bytes by assembling the scaled data bytes into integers from higher order to lower order based on the importance of the attributes for purposes of interpretation.

\* \* \* \* \*